US008892404B2

(12) United States Patent
Potter et al.

(10) Patent No.: US 8,892,404 B2
(45) Date of Patent: Nov. 18, 2014

(54) METHODS AND SYSTEMS FOR CONSISTENT CONCURRENT OPERATION OF A PLURALITY OF COMPUTER-AIDED DESIGN APPLICATIONS

(75) Inventors: Neil Richard Potter, Royston (GB); Boris Rabinovich, Sudbury, MA (US); Asaf Amit, Kefar-Vitkin (IL)

(73) Assignee: Parametric Technology Corporation, Needham, MA (US)

( * ) Notice: Subject to any disclaimer, the term of this patent is extended or adjusted under 35 U.S.C. 154(b) by 60 days.

(21) Appl. No.: 12/914,011

(22) Filed: Oct. 28, 2010

(65) Prior Publication Data

US 2012/0109592 A1 May 3, 2012

(51) Int. Cl.
*G06F 17/50* (2006.01)

(52) U.S. Cl.
CPC ............ *G06F 17/50* (2013.01); *G06F 2217/04* (2013.01)
USPC .............................................. 703/1; 719/313

(58) Field of Classification Search
CPC .............................. G06F 17/50; G06F 17/5086
USPC ............................................................ 703/1
See application file for complete search history.

(56) References Cited

U.S. PATENT DOCUMENTS

| 5,535,386 A | 7/1996 | Wang |
| 5,689,711 A | 11/1997 | Bardasz et al. |
| 6,341,291 B1 * | 1/2002 | Bentley et al. .......... 1/1 |
| 6,445,974 B1 * | 9/2002 | Malaugh et al. .......... 703/1 |
| 6,473,673 B1 | 10/2002 | Kleyman et al. |
| 6,571,203 B2 * | 5/2003 | Fujieda ............................ 703/1 |
| 6,898,560 B1 | 5/2005 | Das |
| 7,006,956 B1 | 2/2006 | Gerlovin et al. |
| 7,069,192 B1 | 6/2006 | Freitag |
| 7,099,804 B2 | 8/2006 | Landers et al. |
| 7,337,093 B2 | 2/2008 | Ramani et al. |
| 7,346,855 B2 * | 3/2008 | Hellyar et al. ............... 715/783 |
| 7,383,272 B2 | 6/2008 | Krishnan et al. |
| 7,623,139 B1 | 11/2009 | Gifford et al. |

(Continued)

FOREIGN PATENT DOCUMENTS

JP 2001028015 A 1/2001

OTHER PUBLICATIONS

International Search Report for PCT/US2011/058412, mailed on May 17, 2012 (4 pages).

(Continued)

*Primary Examiner* — Kamini S Shah
*Assistant Examiner* — Jay B Hann
(74) *Attorney, Agent, or Firm* — Choate, Hall & Stewart LLP; William R. Haulbrook; T. Paul Tanpitukpongse

(57) ABSTRACT

Computer-aided design (CAD) concurrent design management includes a common data model, comprising chapters of different information items to describe various aspects of the CAD model, and lightweight change instructions representative of modifications made by a user to a chapter of the CAD model. By utilizing a common data model and difference-based change instructions, a plurality of users may concurrently collaborate on the design of a CAD model, or a single user may utilize a plurality of applications of a CAD suite efficiently and with an enhanced user experience. Furthermore, the system may manage undo stacks across a plurality of applications concurrently operating on the same shared CAD model, such that the user experiences seamless operation of the plurality of applications.

18 Claims, 28 Drawing Sheets

(56) References Cited

U.S. PATENT DOCUMENTS

| | | |
|---|---|---|
| 7,661,101 B2 | 2/2010 | Chadzynski |
| 7,751,917 B2 | 7/2010 | Rees et al. |
| 8,214,423 B2 | 7/2012 | Freitag |
| 2003/0065413 A1 | 4/2003 | Liteplo et al. |
| 2004/0153824 A1 | 8/2004 | Devarajan et al. |
| 2005/0038642 A1 | 2/2005 | Rameau et al. |
| 2005/0071135 A1 | 3/2005 | Vredenburgh et al. |
| 2005/0203718 A1 | 9/2005 | Carek et al. |
| 2006/0007229 A1 | 1/2006 | Nonclercq et al. |
| 2006/0250418 A1 | 11/2006 | Chartier et al. |
| 2006/0250421 A1 | 11/2006 | Anderson et al. |
| 2007/0073429 A1 | 3/2007 | Rees et al. |
| 2007/0174026 A1 | 7/2007 | Mangon et al. |
| 2007/0198230 A1 | 8/2007 | Wang et al. |
| 2008/0027684 A1 | 1/2008 | Inzinga et al. |
| 2008/0040080 A1 | 2/2008 | Bae et al. |
| 2008/0062195 A1 | 3/2008 | Brown et al. |
| 2008/0201113 A1 | 8/2008 | Stenacker |
| 2008/0247636 A1 | 10/2008 | Davis et al. |
| 2008/0309678 A1 | 12/2008 | Reghetti et al. |
| 2009/0259442 A1 | 10/2009 | Gandikota et al. |
| 2010/0030525 A1 | 2/2010 | Dong et al. |
| 2010/0042676 A1* | 2/2010 | Seroussi et al. ............... 709/203 |
| 2010/0223032 A1 | 9/2010 | Reghetti et al. |
| 2011/0025688 A1 | 2/2011 | Schneider et al. |
| 2011/0148873 A1* | 6/2011 | Radet et al. .................... 345/420 |
| 2012/0109589 A1 | 5/2012 | Thompson et al. |
| 2012/0109590 A1* | 5/2012 | Trainer et al. ..................... 703/1 |
| 2012/0110595 A1* | 5/2012 | Reitman et al. ............... 719/313 |

OTHER PUBLICATIONS

Written Opinion for PCT/US2011/058412, mailed on May 17, 2012 (23 pages).
International Preliminary Report on Patentability for PCT/US2011/058406, mailed on May 10, 2013 (12 pages).
International Preliminary Report on Patentability for PCT/US2011/058412, mailed on Oct. 10, 2013 (12 pages).
International Search Report for PCT/US2011/058406, mailed on May 14, 2012 (4 pages).
Written Opinion for PCT/US2011/058406, mailed on May 14, 2012 (22 pages).

* cited by examiner

| CDM Object 300 | CDM Chapter 302 | Direct Modeling 200 | Parametric Modeling 202 | Engineering Analysis 204 | Configuration Builder 206 | Configuration Modeler 208 | Assembly Modeler 210 | 2-D Concepting 212 | Product Visualization 214 |
|---|---|---|---|---|---|---|---|---|---|
| Part | Geometry | | | | | | | ✗ | |
| | Analysis | ✗ | ✗ | | ✗ | ✗ | ✗ | ✗ | |
| | Appearance | | | | | | | ✗ | |
| | Annotation | | | | | | | ✗ | |
| Assembly | Component Placement | | | | | | | ✗ | |
| | Geometry | | | | | | | ✗ | |
| | Analysis | ✗ | ✗ | | ✗ | ✗ | ✗ | ✗ | |
| | Appearance | | | | | | | ✗ | |
| | Annotation | | | | | | | ✗ | |
| Drawing | Geometry | ✗ | | ✗ | ✗ | ✗ | ✗ | | |
| | Appearance | ✗ | | ✗ | ✗ | ✗ | ✗ | | |
| | Annotation | ✗ | | ✗ | ✗ | ✗ | ✗ | | |
| 2-D Concepting Drawing | Geometry | | | | ✗ | | | | |
| | Annotation | | | | ✗ | | | | |
| Visualization Model | Geometry | | | | | | | ✗ | |
| | Appearance | | | | | | | ✗ | |
| | Annotation | | | | | | | | ✗ |

☐ App can read the chapter

☒ App cannot read the chapter at all

*Fig. 3A*

METHODS AND SYSTEMS FOR CONSISTENT CONCURRENT OPERATION OF A PLURALITY OF COMPUTER-AIDED DESIGN APPLICATIONS

FIELD OF THE INVENTION

The present disclosure relates to methods and systems for computer-aided design. In particular, the present disclosure relates to methods and system for concurrent operation of a plurality of computer-aided design applications on a shared object or model, while maintaining consistency of the shared object or model.

BACKGROUND OF THE INVENTION

In many industries, from industrial product design to 3D animation, computer-aided design (CAD) applications, computer-aided engineering (CAE) applications, computer-aided manufacturing (CAM) applications, or others are used for creating, manipulating, displaying, or analyzing two- and three-dimensional models of objects. These applications, referred to generally as CAD applications, allow a user to input and view a design for a particular structure in the form of an object. The user can often rotate the view of the object to any angle, and also zoom in or zoom out for different views and perspectives. Additional visual features such as highlighting, shading, cross-hatching, coloring, texturing, and others enable the user to design an object with the aid of a computing device. In some versions of CAD applications, known as parametric or history-based CAD, the application can also keep track of and monitor design changes to the object in addition to design dependencies. Accordingly, when the user adds or changes an element within the object, other values that depend on that change may be automatically updated in accordance with engineering concepts and rules of design. For example, a length of a first object may be defined by a formula that includes, as a variable, a length of a second object. Accordingly, modifying the length of the second object may cause the CAD application to recalculate the length of the first object and regenerate the model.

Many different applications are used for different functions, frequently by different users with a manufacturing or design group. For example, a product designer may use a parametric modeling CAD application to create or edit a model, a standards certification engineer may use an engineering analysis application to determine if a product built from the model will comply with engineering requirements such as weight or strength, a sales representative may use a configuration building application to specify product options for a customer, and a project manager may use a visualization application to view and annotate the model. However, these applications typically have different data models, requiring time-consuming importing and exporting as the model is passed around from user to user. Additionally, during translation from one data model to another, information may be lost.

BRIEF SUMMARY OF THE INVENTION

The present disclosure is directed to systems and methods for managing concurrent design of computer-aided design objects or models. The systems include a common data model, comprising chapters of different information items to describe various aspects of the CAD model, and lightweight change instructions representative of modifications made by a user to a chapter of the CAD model. By utilizing a common data model and difference-based change instructions, a plurality of users may concurrently collaborate on the design of a CAD model, or a single user may utilize a plurality of applications of a CAD suite efficiently and with an enhanced user experience. Furthermore, the system may manage undo stacks across a plurality of applications concurrently operating on the same shared CAD model, such that the user experiences seamless operation of the plurality of applications.

In one aspect, the present disclosure is directed to a method of managing concurrent design of computer-aided design (CAD) objects or models. The method includes storing, by a first CAD application executed by a processor of a computing device, a starting state of a CAD model. The method also includes modifying, by a user of the first CAD application, the CAD model. The method further includes creating, by the first CAD application and responsive to the modification, a first one or more change instructions representative of the user's modification to the CAD model. The method also includes loading, by a second CAD application executed by the processor of the computing device, the stored starting state of the CAD model and the first one or more change instructions. The method also includes executing, by the second CAD application, the first one or more change instructions to reproduce the user's modification to the CAD model.

In one embodiment, the method includes storing the starting state of the CAD model, responsive to loading the CAD model by the first CAD application. In another embodiment, the method includes modifying, by the user, a first one or more objects of the CAD model; and regenerating, by the first CAD application, a second one or more objects of the CAD model dependent on the first one or more objects. In a further embodiment, the method includes creating a first one or more change instructions representative of the user's modification to the first one or more objects, such that execution of the one or more change instructions causes a CAD application to regenerate the second one or more objects dependent on the first one or more objects.

In some embodiments, the method includes loading the stored starting state and the first one or more change instructions, responsive to the user making the second CAD application active. In a further embodiment, the method includes executing the first one or more change instructions, responsive to the user making the second CAD application active.

In other embodiments, the method includes modifying, by the user via the second CAD application, the CAD model. The method also includes creating, by the second CAD application and responsive to the modification, a second one or more change instructions representative of the user's modification to the CAD model. The method further includes loading, by the first CAD application, the second one or more change instructions. The method also includes executing, by the first CAD application, the second one or more change instructions to reproduce the user's modification to the CAD model. In a further embodiment, the second one or more change instructions represent the user's modifications to the CAD model in the second CAD application subsequent to execution of the first one or more change instructions. In another further embodiment, the method includes requesting to undo the first one or more change instructions, by the user via the first CAD application; and loading, by the first CAD application, the starting state of the CAD model. In a still further embodiment, the method includes executing, by the first CAD application, the second one or more change instructions, wherein the second one or more change instructions modify a chapter of the CAD model unrelated to the chapter modified by the first one or more change instructions.

In another aspect, the present disclosure features a system for managing concurrent design of computer-aided design (CAD) objects or models. The system includes a computing device comprising a processor executing a first CAD application and a second CAD application. The first CAD application is configured to store a starting state of a CAD model; modify the CAD model responsive to a request by a user of the first CAD application; and create, responsive to the modification, a first one or more change instructions representative of the user's modification to the CAD model. The second CAD application is configured to load the stored starting state of the CAD model and the first one or more change instructions; and execute the first one or more change instructions to reproduce the user's modification to the CAD model.

In one embodiment, the first CAD application is configured to store the starting state of the CAD model, responsive to loading the CAD model by the first CAD application. In another embodiment, the first CAD application is configured to modify, responsive to a request by the user, a first one or more objects of the CAD model; and regenerate a second one or more objects of the CAD model dependent on the first one or more objects. In a further embodiment, the first CAD application is configured to create a first one or more change instructions representative of the user's modification to the first one or more objects, such that execution of the one or more change instructions causes a CAD application to regenerate the second one or more objects dependent on the first one or more objects.

In some embodiments, the second CAD application is configured to load the stored starting state and the first one or more change instructions, responsive to the user making the second CAD application active. In a further embodiment, the second CAD application is configured to execute the first one or more change instructions, responsive to the user making the second CAD application active.

In one embodiment, the second CAD application is configured to modify the CAD model responsive to a request from the user, and create, responsive to the modification, a second one or more change instructions representative of the user's modification to the CAD model; and the first CAD application is configured to load the second one or more change instructions; and execute the second one or more change instructions to reproduce the user's modification to the CAD model. In a further embodiment, the second one or more change instructions represent the user's modifications to the CAD model in the second CAD application subsequent to execution of the first one or more change instructions. In another further embodiment, responsive to a request by the user to undo the first one or more change instructions, the first CAD application is configured to load the starting state of the CAD model. In still another further embodiment, the first CAD application is configured to execute the second one or more change instructions, wherein the second one or more change instructions modify a chapter of the CAD model unrelated to the chapter modified by the first one or more change instructions.

In another aspect, the present disclosure is directed to a system for managing concurrent design of computer-aided design (CAD) models. The system includes a computing device comprising a processor. The processor is configured to execute a first CAD application for performing a first modification to a shared CAD model, responsive to a first request from a user; and a second, simultaneously executing CAD application for displaying the first modification to the shared CAD model, responsive to the first CAD application performing the first modification.

In one embodiment, the system includes the second, simultaneously executing CAD application configured to display the first modification to the shared CAD model without a subsequent request from the user. In another embodiment, the system includes the second, simultaneously executing CAD application is configured to display the first modification to the shared CAD model without the user requesting to save the first modification.

In some embodiments, the system includes the second, simultaneously executing CAD application is configured to undo the first modification to the shared CAD model performed by the first CAD application, responsive to a second request from the user. In other embodiments, the system includes the second, simultaneously executing CAD application is configured to save the first modification to the shared CAD model performed by the first CAD application, responsive to a second request from the user.

The details of various embodiments of the invention are set forth in the accompanying drawings and the description below.

BRIEF DESCRIPTION OF THE FIGURES

The foregoing and other objects, aspects, features, and advantages of the disclosure will become more apparent and better understood by referring to the following description taken in conjunction with the accompanying drawings, in which:

FIG. 3A is a comparison diagram of usage of different chapters of a common data model by a plurality of applications;

Figure 1A:
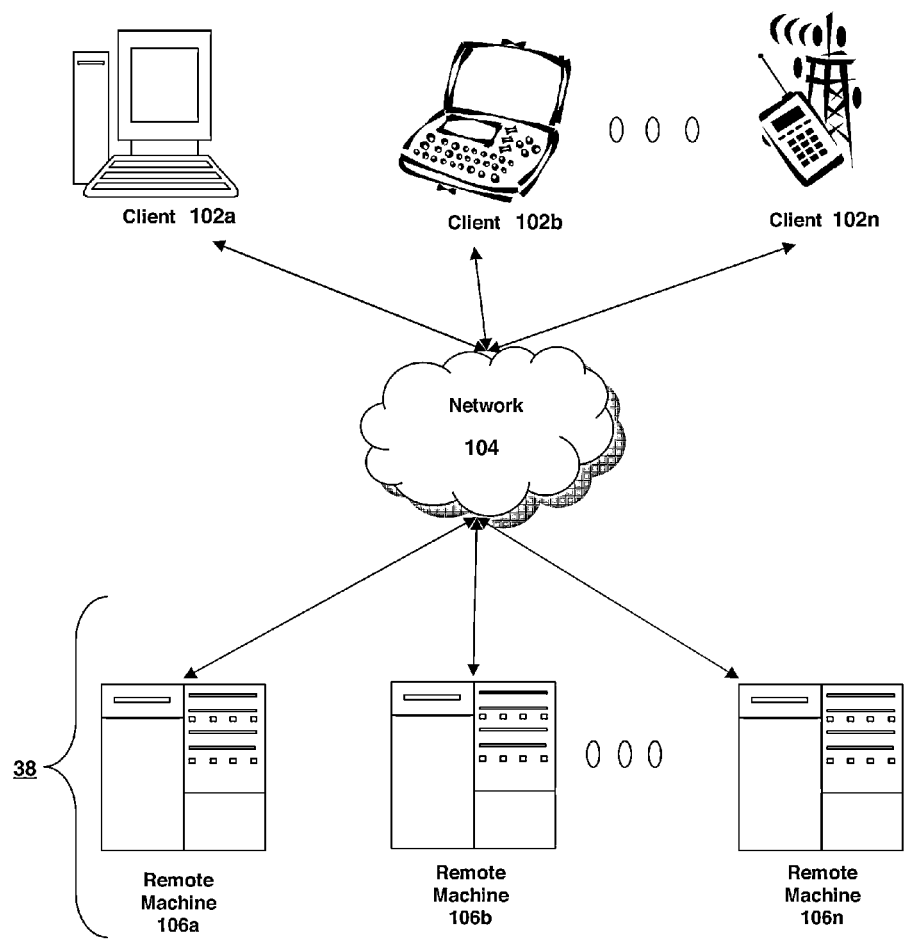
FIG. 1A is a block diagram depicting an embodiment of a network environment comprising local machines in communication with remote machines.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION OF THE INVENTION

For purposes of reading the description of the various embodiments below, the following descriptions of the sections of the specification and their respective contents may be helpful:

Section A describes a network environment and computing environment which may be useful for practicing embodiments described herein; and Section B describes embodiments of systems and methods for using and managing a common data model with a plurality of product design applications.

A. Network and Computing Environment

Before discussing details of the embodiments of methods and systems of computer-aided design, it may be useful to briefly describe a network environment and computing environment which may be useful for practicing the embodiments herein. Referring now to FIG. 1A, an embodiment of a network environment is depicted. In brief overview, the network environment comprises one or more local machines 102a-102n (also generally referred to as local machine(s) 102, client(s) 102, client node(s) 102, client machine(s) 102, client computer(s) 102, client device(s) 102, endpoint(s) 102, or endpoint node(s) 102) in communication with one or more remote machines 106a-106n (also generally referred to as server(s) 106 or remote machine(s) 106) via one or more networks 104. In some embodiments, a local machine 102 has the capacity to function as both a client node seeking access to resources provided by a server and as a server providing access to hosted resources for other clients 102a-102n.

Although FIG. 1A shows a network 104 between the local machines 102 and the remote machines 106, the local machines 102 and the remote machines 106 may be on the same network 104. The network 104 can be a local-area network (LAN), such as a company Intranet, a metropolitan area network (MAN), or a wide area network (WAN), such as the Internet or the World Wide Web. In some embodiments, there are multiple networks 104 between the local machines 102 and the remote machines 106. In one of these embodiments, a network 104' (not shown) may be a private network and a network 104 may be a public network. In another of these embodiments, a network 104 may be a private network and a network 104' a public network. In still another embodiment, networks 104 and 104' may both be private networks. In yet another embodiment, networks 104 and 104' may both be public networks.

The network 104 may be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network 104 may comprise a wireless link, such as an infrared channel or satellite band. The topology of the network 104 may be a bus, star, or ring network topology. The network 104 may be of any such network topology as known to those ordinarily skilled in the art capable of supporting the operations described herein. The network may comprise mobile telephone networks utilizing any protocol or protocols used to communicate among mobile devices, including AMPS, TDMA, CDMA, GSM, GPRS or UMTS. In some embodiments, different types of data may be transmitted via different protocols. In other embodiments, the same types of data may be transmitted via different protocols.

In some embodiments, the system may include multiple, logically-grouped remote machines 106. In one of these embodiments, the logical group of remote machines may be referred to as a server farm 38. In another of these embodiments, the remote machines 106 may be geographically dispersed. In other embodiments, a server farm 38 may be administered as a single entity. In still other embodiments, the server farm 38 comprises a plurality of server farms 38. The remote machines 106 within each server farm 38 can be heterogeneous—one or more of the remote machines 106 can operate according to one type of operating system platform (e.g., WINDOWS NT, WINDOWS 2003, WINDOWS 2008, WINDOWS 7 and WINDOWS Server 2008 R2, all of which are manufactured by Microsoft Corp. of Redmond, Wash.), while one or more of the other remote machines 106 can operate on according to another type of operating system platform (e.g., Unix or Linux).

The remote machines 106 of each server farm 38 do not need to be physically proximate to another remote machine 106 in the same server farm 38. Thus, the group of remote machines 106 logically grouped as a server farm 38 may be interconnected using a wide-area network (WAN) connection or a metropolitan-area network (MAN) connection. For example, a server farm 38 may include remote machines 106 physically located in different continents or different regions of a continent, country, state, city, campus, or room. Data transmission speeds between remote machines 106 in the server farm 38 can be increased if the remote machines 106 are connected using a local-area network (LAN) connection or some form of direct connection.

A remote machine 106 may be a file server, application server, web server, proxy server, appliance, network appliance, gateway, application gateway, gateway server, virtualization server, deployment server, SSL VPN server, or firewall. In some embodiments, a remote machine 106 provides a remote authentication dial-in user service, and is referred to as a RADIUS server. In other embodiments, a remote machine 106 may have the capacity to function as either an application server or as a master application server. In still other embodiments, a remote machine 106 is a blade server. In yet other embodiments, a remote machine 106 executes a virtual machine providing, to a user or client computer 102, access to a computing environment.

In one embodiment, a remote machine 106 may include an Active Directory. The remote machine 106 may be an application acceleration appliance. For embodiments in which the remote machine 106 is an application acceleration appliance, the remote machine 106 may provide functionality including firewall functionality, application firewall functionality, or load balancing functionality. In some embodiments, the remote machine 106 comprises an appliance such as one of the line of appliances manufactured by the Citrix Application Networking Group, of San Jose, Calif., or Silver Peak Systems, Inc., of Mountain View, Calif., or of Riverbed Technology, Inc., of San Francisco, Calif., or of F5 Networks, Inc., of Seattle, Wash., or of Juniper Networks, Inc., of Sunnyvale, Calif.

In some embodiments, a remote machine 106 executes an application on behalf of a user of a local machine 102. In other embodiments, a remote machine 106 executes a virtual machine, which provides an execution session within which applications execute on behalf of a user of a local machine 102. In one of these embodiments, the execution session is a hosted desktop session. In another of these embodiments, the execution session provides access to a computing environment, which may comprise one or more of: an application, a plurality of applications, a desktop application, and a desktop session in which one or more applications may execute.

In some embodiments, a local machine 102 communicates with a remote machine 106. In one embodiment, the local machine 102 communicates directly with one of the remote machines 106 in a server farm 38. In another embodiment, the local machine 102 executes a program neighborhood application to communicate with a remote machine 106 in a server farm 38. In still another embodiment, the remote machine 106 provides the functionality of a master node. In some embodiments, the local machine 102 communicates with the remote machine 106 in the server farm 38 through a network 104. Over the network 104, the local machine 102 can, for example, request execution of various applications hosted by the remote machines 106a-106n in the server farm 38 and receive output of the results of the application execution for display. In some embodiments, only a master node provides the functionality required to identify and provide address information associated with a remote machine 106b hosting a requested application.

In one embodiment, the remote machine 106 provides the functionality of a web server. In another embodiment, the remote machine 106a receives requests from the local machine 102, forwards the requests to a second remote machine 106b and responds to the request by the local machine 102 with a response to the request from the remote machine 106b. In still another embodiment, the remote machine 106a acquires an enumeration of applications available to the local machine 102 and address information associated with a remote machine 106b hosting an application identified by the enumeration of applications. In yet another embodiment, the remote machine 106 presents the response to the request to the local machine 102 using a web interface. In one embodiment, the local machine 102 communicates directly with the remote machine 106 to access the identified application. In another embodiment, the local machine 102 receives output data, such as display data, generated by an execution of the identified application on the remote machine 106.

In some embodiments, the remote machine 106 or a server farm 38 may be running one or more applications, such as an application providing a thin-client computing or remote display presentation application. In one embodiment, the remote machine 106 or server farm 38 executes as an application any portion of the CITRIX ACCESS SUITE by Citrix Systems, Inc., such as the METAFRAME or CITRIX PRESENTATION SERVER products, any of the following products manufactured by Citrix Systems, Inc.: CITRIX XENAPP, CITRIX XENDESKTOP, CITRIX ACCESS GATEWAY, and/or any of the MICROSOFT WINDOWS Terminal Services manufactured by the Microsoft Corporation. In another embodiment, the application is an ICA client, developed by Citrix Systems, Inc. of Fort Lauderdale, Fla. In still another embodiment, the remote machine 106 may run an application, which, for example, may be an application server providing email services such as MICROSOFT EXCHANGE manufactured by the Microsoft Corporation of Redmond, Wash., a web or Internet server, or a desktop sharing server, or a collaboration server. In yet another embodiment, any of the applications may comprise any type of hosted service or products, such as GOTOMEETING provided by Citrix Online Division, Inc. of Santa Barbara, Calif., WEBEX provided by WebEx, Inc. of Santa Clara, Calif., or Microsoft Office LIVE MEETING provided by Microsoft Corporation of Redmond, Wash.

A local machine 102 may execute, operate or otherwise provide an application, which can be any type and/or form of software, program, or executable instructions such as any type and/or form of web browser, web-based client, client-server application, a thin-client computing client, an ActiveX control, or a Java applet, or any other type and/or form of executable instructions capable of executing on local machine 102. In some embodiments, the application may be a server-based or a remote-based application executed on behalf of the local machine 102 on a remote machine 106. In other embodiments, the remote machine 106 may display output to the local machine 102 using any thin-client protocol, presentation layer protocol, or remote-display protocol, such as the Independent Computing Architecture (ICA) protocol manufactured by Citrix Systems, Inc. of Ft. Lauderdale, Fla.; the Remote Desktop Protocol (RDP) manufactured by the Microsoft Corporation of Redmond, Wash.; the X11 protocol; the Virtual Network Computing (VNC) protocol, manufactured by AT&T Bell Labs; the SPICE protocol, manufactured by Qumranet, Inc., of Sunnyvale, Calif., USA, and of Raanana, Israel; the Net2Display protocol, manufactured by VESA, of Milpitas, Calif.; the PC-over-IP protocol, manufactured by Teradici Corporation, of Burnaby, B.C.; the TCX protocol, manufactured by Wyse Technology, Inc., of San Jose, Calif.; the THINC protocol developed by Columbia University in the City of New York, of N.Y., NY; or the Virtual-D protocols manufactured by Desktone, Inc., of Chelmsford, Mass. The application can use any type of protocol and it can be, for example, an HTTP client, an FTP client, an Oscar client, or a Telnet client. In still other embodiments, the application comprises any type of software related to voice over Internet protocol (VoIP) communications, such as a soft IP telephone. In further embodiments, the application comprises any application related to real-time data communications, such as applications for streaming video and/or audio. In other embodiments, the application comprises any application related to computer-aided design (CAD), computer-aided manufacturing (CAM), computer-aided engineering (CAE), product life-cycle management (PLM), project management, resource management, customer relationship management (CRM), or any other application for the generation, modification, modeling, and/or analysis of data.

Figure 1B:
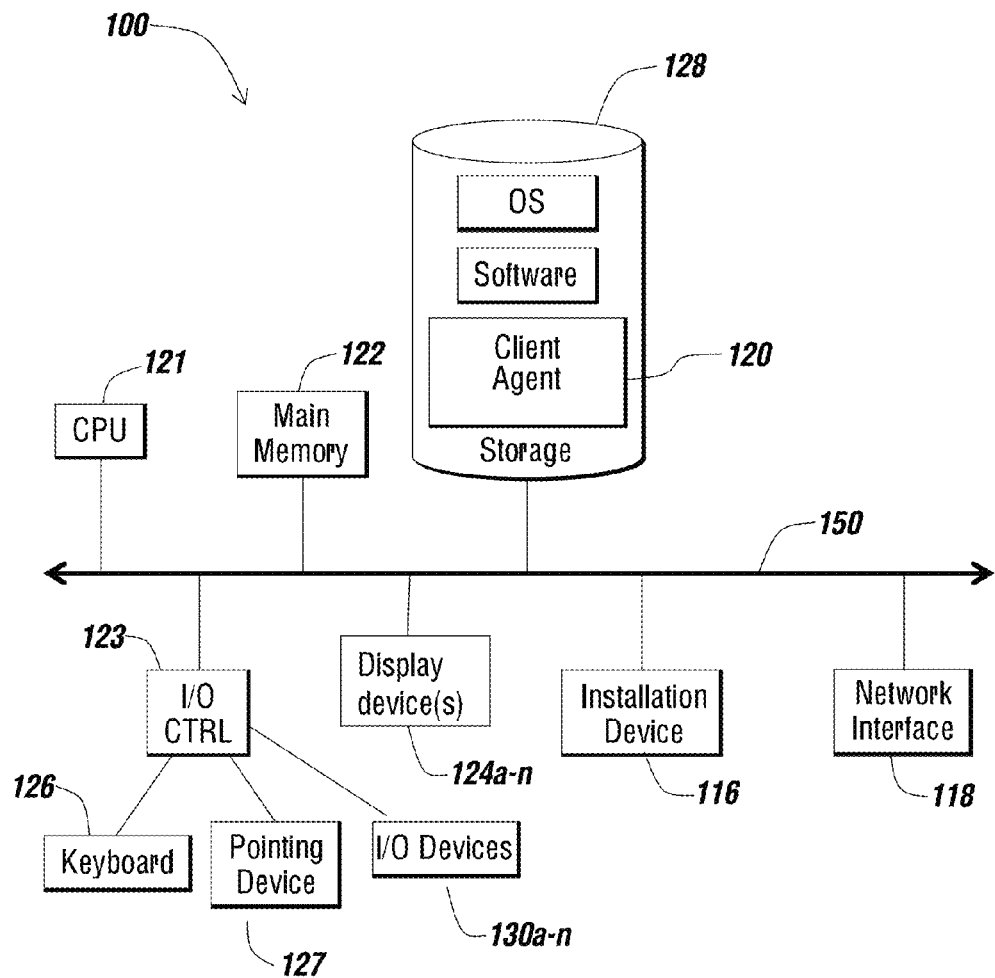
FIGS. 1B-1E are block diagrams depicting embodiments of computers useful in connection with the methods and systems described herein.
Figure 1C:
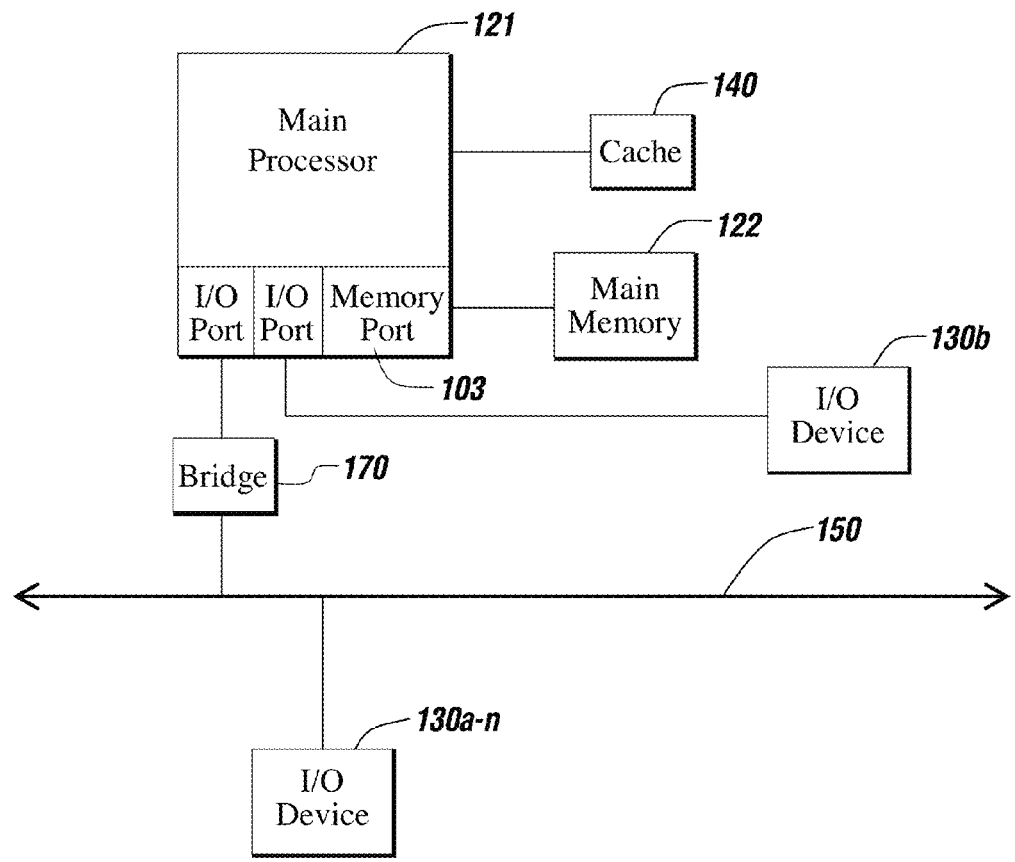

The local machine 102 and remote machine 106 may be deployed as and/or executed on any type and form of computing device, such as a computer, network device or appliance capable of communicating on any type and form of network and performing the operations described herein. FIGS. 1B and 1C depict block diagrams of a computing device 100 useful for practicing an embodiment of the local machine 102 or a remote machine 106. As shown in FIGS. 1B and 1C, each computing device 100 includes a central processing unit 121, and a main memory unit 122. As shown in FIG. 1B, a computing device 100 may include a storage device 128, an installation device 116, a network interface 118, an I/O controller 123, display devices 124a-n, a keyboard 126 and a pointing device 127, such as a mouse. The storage device 128 may include, without limitation, an operating system, software, and a client agent 120. As shown in FIG. 1C, each computing device 100 may also include additional optional elements, such as a memory port 103, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; the RS/6000 processor, those manufactured by International Business Machines of White Plains, N.Y.; or those manufactured by Advanced Micro Devices of Sunnyvale, Calif. The computing device 100 may be based on any of these processors, or any other processor capable of operating as described herein.

Main memory unit 122 may be one or more memory chips capable of storing data and allowing any storage location to be directly accessed by the microprocessor 121, such as Static random access memory (SRAM), Burst SRAM or Synch-Burst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 122 may be based on any of the above described memory chips, or any other available memory chips capable of operating as described herein. In the embodiment shown in FIG. 1B, the processor 121 communicates with main memory 122 via a system bus 150 (described in more detail below). FIG. 1C depicts an embodiment of a computing device 100 in which the processor communicates directly with main memory 122 via a memory port 103. For example, in FIG. 1C the main memory 122 may be DRDRAM.

FIG. 1C depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1B, the processor 121 communicates with various I/O devices 130 via a local system bus 150. Various buses may be used to connect the central processing unit 121 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 121 may use an Advanced Graphics Port (AGP) to communicate with the display 124. FIG. 1C depicts an embodiment of a computer 100 in which the main processor 121 communicates directly with I/O device 130b via HYPERTRANSPORT, RAPIDIO, or INFINIBAND communications technology. FIG. 1C also depicts an embodiment in which local busses and direct communication are mixed: the processor 121 communicates with I/O device 130a using a local interconnect bus while communicating with I/O device 130b directly.

A wide variety of I/O devices 130a-130n may be present in the computing device 100. Input devices include keyboards, mice, trackpads, trackballs, microphones, and drawing tablets. Output devices include video displays, speakers, inkjet printers, laser printers, and dye-sublimation printers. An I/O controller 123, as shown in FIG. 1B, may control the I/O devices. The I/O controller may control one or more I/O devices such as a keyboard 126 and a pointing device 127, e.g., a mouse or optical pen. Furthermore, an I/O device may also provide storage and/or an installation medium 116 for the computing device 100. In still other embodiments, the computing device 100 may provide USB connections (not shown) to receive handheld USB storage devices such as the USB Flash Drive line of devices manufactured by Twintech Industry, Inc. of Los Alamitos, Calif.

Referring again to FIG. 1B, the computing device 100 may support any suitable installation device 116, such as a floppy disk drive for receiving floppy disks such as 3.5-inch, 5.25-inch disks or ZIP disks, a CD-ROM drive, a CD-R/RW drive, a DVD-ROM drive, tape drives of various formats, USB device, hard-drive or any other device suitable for installing software and programs. The computing device 100 may further comprise a storage device, such as one or more hard disk drives or redundant arrays of independent disks, for storing an operating system and other related software, and for storing application software programs such as any program related to the client agent 120. Optionally, any of the installation devices 116 could also be used as the storage device. Additionally, the operating system and the software can be run from a bootable medium, for example, a bootable CD, such as KNOPPIX, a bootable CD for GNU/Linux that is available as a GNU/Linux distribution from knoppix.net.

Furthermore, the computing device 100 may include a network interface 118 to interface to the network 104 through a variety of connections including, but not limited to, standard telephone lines, LAN or WAN links (e.g., 802.11, Ti, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, CDMA, GSM, WiMax and direct asynchronous connections). In one embodiment, the computing device 100 communicates with other computing devices 100' via any type and/or form of gateway or tunneling protocol such as Secure Socket Layer (SSL) or Transport Layer Security (TLS), or the Citrix Gateway Protocol manufactured by Citrix Systems, Inc. of Ft. Lauderdale, Fla. The network interface 118 may comprise a built-in network adapter, network interface card, PCMCIA network card, card bus network adapter, wireless network adapter, USB network adapter, modem or any other device suitable for interfacing the computing device 100 to any type of network capable of communication and performing the operations described herein.

In some embodiments, the computing device 100 may comprise or be connected to multiple display devices 124a-124n, which each may be of the same or different type and/or form. As such, any of the I/O devices 130a-130n and/or the I/O controller 123 may comprise any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may comprise multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices, such as computing devices 100a and 100b connected to the computing device 100, for example, via a network. These embodiments may include any type of software designed and constructed to use another computer's display device as a second display device 124a for the computing device 100. One ordinarily skilled in the art will recognize and appreciate the various ways and embodiments that a computing device 100 may be configured to have multiple display devices 124a-124n.

In further embodiments, an I/O device 130 may be a bridge between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a Fibre-Channel bus, or a Serial Attached small computer system interface bus.

A computing device 100 of the sort depicted in FIGS. 1B and 1C typically operates under the control of operating systems, which control scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 3.x, WINDOWS 95, WINDOWS 98, WINDOWS 2000, WINDOWS NT 3.51, WINDOWS NT 4.0, WINDOWS 7, WINDOWS CE, WINDOWS XP, and WINDOWS VISTA, all of which are manufactured by Microsoft Corporation of Redmond, Wash.; MAC OS, manufactured by Apple Inc., of Cupertino, Calif.; OS/2, manufactured by International Business Machines of Armonk, N.Y.; and Linux, a freely-available operating system distributed by Caldera Corp. of Salt Lake City, Utah, or any type and/or form of a Unix operating system, among others.

The computing device 100 can be any workstation, desktop computer, laptop or notebook computer, server, handheld computer, mobile telephone or other portable telecommunication device, media playing device, a gaming system, mobile computing device, or any other type and/or form of computing, telecommunications or media device that is capable of communication and that has sufficient processor power and memory capacity to perform the operations described herein. For example, the computing device 100 may comprise a device of the IPOD family of devices manufactured by Apple Inc., of Cupertino, Calif., a PLAYSTATION 2, PLAYSTATION 3, or PERSONAL PLAYSTATION PORTABLE (PSP) device manufactured by the Sony Corporation of Tokyo, Japan, a NINTENDO DS, NINTENDO GAMEBOY, NINTENDO GAMEBOY ADVANCED or NINTENDO REVOLUTION device manufactured by Nintendo Co., Ltd., of Kyoto, Japan, or an XBOX or XBOX 360 device manufactured by the Microsoft Corporation of Redmond, Wash.

In some embodiments, the computing device 100 may have different processors, operating systems, and input devices consistent with the device. For example, in one embodiment, the computing device 100 is a TREO 180, 270, 600, 650, 680, 700p, 700w/wx, 750, 755p, 800w, Centro, or Pro smart phone manufactured by Palm, Inc. In some of these embodiments, the TREO smart phone is operated under the control of the PalmOS operating system and includes a stylus input device as well as a five-way navigator device.

In other embodiments the computing device 100 is a mobile device, such as a JAVA-enabled cellular telephone or personal digital assistant (PDA), such as the i55sr, i58sr, i85s, i88s, i90c, i95cl, i335, i365, i570, 1576, i580, i615, i760, i836, i850, i870, i880, i920, i930, ic502, ic602, ic902, i776 or the im1100, all of which are manufactured by Motorola Corp. of Schaumburg, Ill., the 6035 or the 7135, manufactured by Kyocera of Kyoto, Japan, or the i300 or i330, manufactured by Samsung Electronics Co., Ltd., of Seoul, Korea. In some embodiments, the computing device 100 is a mobile device manufactured by Nokia of Finland, or by Sony Ericsson Mobile Communications AB of Lund, Sweden.

In still other embodiments, the computing device 100 is a Blackberry handheld or smart phone, such as the devices manufactured by Research In Motion Limited, including the Blackberry 7100 series, 8700 series, 7700 series, 7200 series, the Blackberry 7520, the Blackberry PEARL 8100, the 8700 series, the 8800 series, the Blackberry Storm, Blackberry Bold, Blackberry Curve 8900, and the Blackberry Pearl Flip. In yet other embodiments, the computing device 100 is a smart phone, Pocket PC, Pocket PC Phone, or other handheld mobile device supporting Microsoft Windows Mobile Software. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

In some embodiments, the computing device 100 is a digital audio player. In one of these embodiments, the computing device 100 is a digital audio player such as the Apple IPOD, IPOD Touch, IPOD NANO, and IPOD SHUFFLE lines of devices, manufactured by Apple Inc., of Cupertino, Calif. In another of these embodiments, the digital audio player may function as both a portable media player and as a mass storage device. In other embodiments, the computing device 100 is a digital audio player such as the DigitalAudioPlayer Select MP3 players, manufactured by Samsung Electronics America, of Ridgefield Park, N.J., or the Motorola m500 or m25 Digital Audio Players, manufactured by Motorola Inc. of Schaumburg, Ill. In still other embodiments, the computing device 100 is a portable media player, such as the Zen Vision W, the Zen Vision series, the Zen Portable Media Center devices, or the Digital MP3 line of MP3 players, manufactured by Creative Technologies Ltd. In yet other embodiments, the computing device 100 is a portable media player or digital audio player supporting file formats including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, the computing device 100 comprises a combination of devices, such as a mobile phone combined with a digital audio player or portable media player. In one of these embodiments, the computing device 100 is a Motorola RAZR or Motorola ROKR line of combination digital audio players and mobile phones. In another of these embodiments, the computing device 100 is a device in the iPhone line of smartphones, manufactured by Apple Inc., of Cupertino, Calif.

In one embodiment, a computing device 102a may request resources from a remote machine 106, while providing the functionality of a remote machine 106 to a client 102b. In such an embodiment, the computing device 102a may be referred to as a client with respect to data received from the remote machine 106 (which may be referred to as a server) and the computing device 102a may be referred to as a server with respect to the second client 102b. In another embodiment, the client 102 may request resources from the remote machine 106 on behalf of a user of the client 102.

Figure 1D:
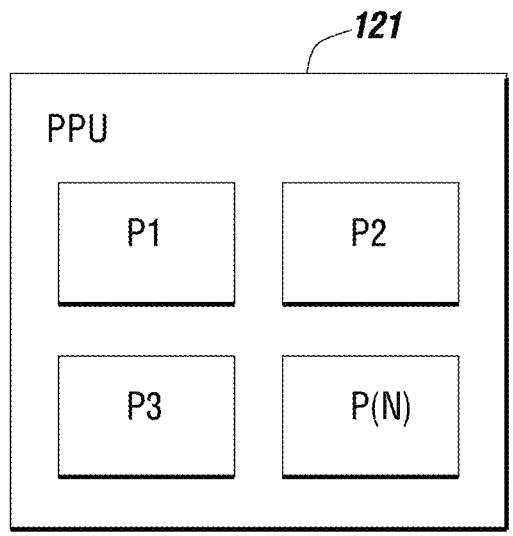

As shown in FIG. 1D, the computing device 100 may comprise multiple processors and may provide functionality for simultaneous execution of instructions or for simultaneous execution of one instruction on more than one piece of data. In some embodiments, the computing device 100 may comprise a parallel processor with one or more cores. In one of these embodiments, the computing device 100 is a shared memory parallel device, with multiple processors and/or multiple processor cores, accessing all available memory as a single global address space. In another of these embodiments, the computing device 100 is a distributed memory parallel device with multiple processors each accessing local memory only. In still another of these embodiments, the computing device 100 has both some memory which is shared and some memory which can only be accessed by particular processors or subsets of processors. In still even another of these embodiments, the computing device 100, such as a multicore microprocessor, combines two or more independent processors into a single package, often a single integrated circuit (IC). In yet another of these embodiments, the computing device 100 includes a chip having a CELL BROADBAND ENGINE architecture and including a Power processor element and a plurality of synergistic processing elements, the Power processor element and the plurality of synergistic processing elements linked together by an internal high speed bus, which may be referred to as an element interconnect bus.

In some embodiments, the processors provide functionality for execution of a single instruction simultaneously on multiple pieces of data (SIMD). In other embodiments, the processors provide functionality for execution of multiple instructions simultaneously on multiple pieces of data (MIMD). In still other embodiments, the processor may use any combination of SIMD and MIMD cores in a single device.

Figure 1E:
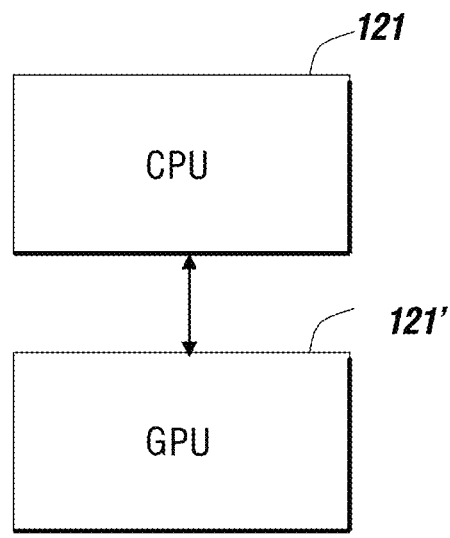

In some embodiments, the computing device 100 may comprise a graphics processing unit. In one of these embodiments, depicted in FIG. 1E, the computing device 100 includes at least one central processing unit 121 and at least one graphics processing unit. In another of these embodiments, the computing device 100 includes at least one parallel processing unit and at least one graphics processing unit. In still another of these embodiments, the computing device 100 includes a plurality of processing units of any type, one of the plurality of processing units comprising a graphics processing unit.

In one embodiment, a resource may be a program, an application, a document, a file, a plurality of applications, a plurality of files, an executable program file, a desktop environment, a computing environment, or other resource made available to a user of the local computing device 102. The resource may be delivered to the local computing device 102 via a plurality of access methods including, but not limited to, conventional installation directly on the local computing device 102, delivery to the local computing device 102 via a method for application streaming, delivery to the local computing device 102 of output data generated by an execution of the resource on a third computing device 106b and communicated to the local computing device 102 via a presentation layer protocol, delivery to the local computing device 102 of output data generated by an execution of the resource via a virtual machine executing on a remote computing device 106, or execution from a removable storage device connected to the local computing device 102, such as a USB device, or via a virtual machine executing on the local computing device 102 and generating output data. In some embodiments, the local computing device 102 transmits output data generated by the execution of the resource to another client computing device 102b.

In some embodiments, a user of a local computing device 102 connects to a remote computing device 106 and views a display on the local computing device 102 of a local version of a remote desktop environment, comprising a plurality of data objects, generated on the remote computing device 106. In one of these embodiments, at least one resource is provided to the user by the remote computing device 106 (or by a second remote computing device 106b) and displayed in the remote desktop environment. However, there may be resources that the user executes on the local computing device 102, either by choice, or due to a policy or technological requirement. In another of these embodiments, the user of the local computing device 102 would prefer an integrated desktop environment providing access to all of the resources available to the user, instead of separate desktop environments for resources provided by separate machines. For example, a user may find navigating between multiple graphical displays confusing and difficult to use productively. Or, a user may wish to use the data generated by one application provided by one machine in conjunction with another resource provided by a different machine. In still another of these embodiments, requests for execution of a resource, windowing moves, application minimize/maximize, resizing windows, and termination of executing resources may be controlled by interacting with a remote desktop environment that integrates the display of the remote resources and of the local resources. In yet another of these embodiments, an application or other resource accessible via an integrated desktop environment— including those resources executed on the local computing device 102 and those executed on the remote computing device 106—is shown in a single desktop environment.

In one embodiment, data objects from a remote computing device 106 are integrated into a desktop environment generated by the local computing device 102. In another embodiment, the remote computing device 106 maintains the integrated desktop. In still another embodiment, the local computing device 102 maintains the integrated desktop.

In some embodiments, a single remote desktop environment 204 is displayed. In one of these embodiments, the remote desktop environment 204 is displayed as a full-screen desktop. In other embodiments, a plurality of remote desktop environments 204 is displayed. In one of these embodiments, one or more of the remote desktop environments are displayed in non-full-screen mode on one or more display devices 124. In another of these embodiments, the remote desktop environments are displayed in full-screen mode on individual display devices. In still another of these embodiments, one or more of the remote desktop environments are displayed in full-screen mode on one or more display devices 124.

Figure 2A:
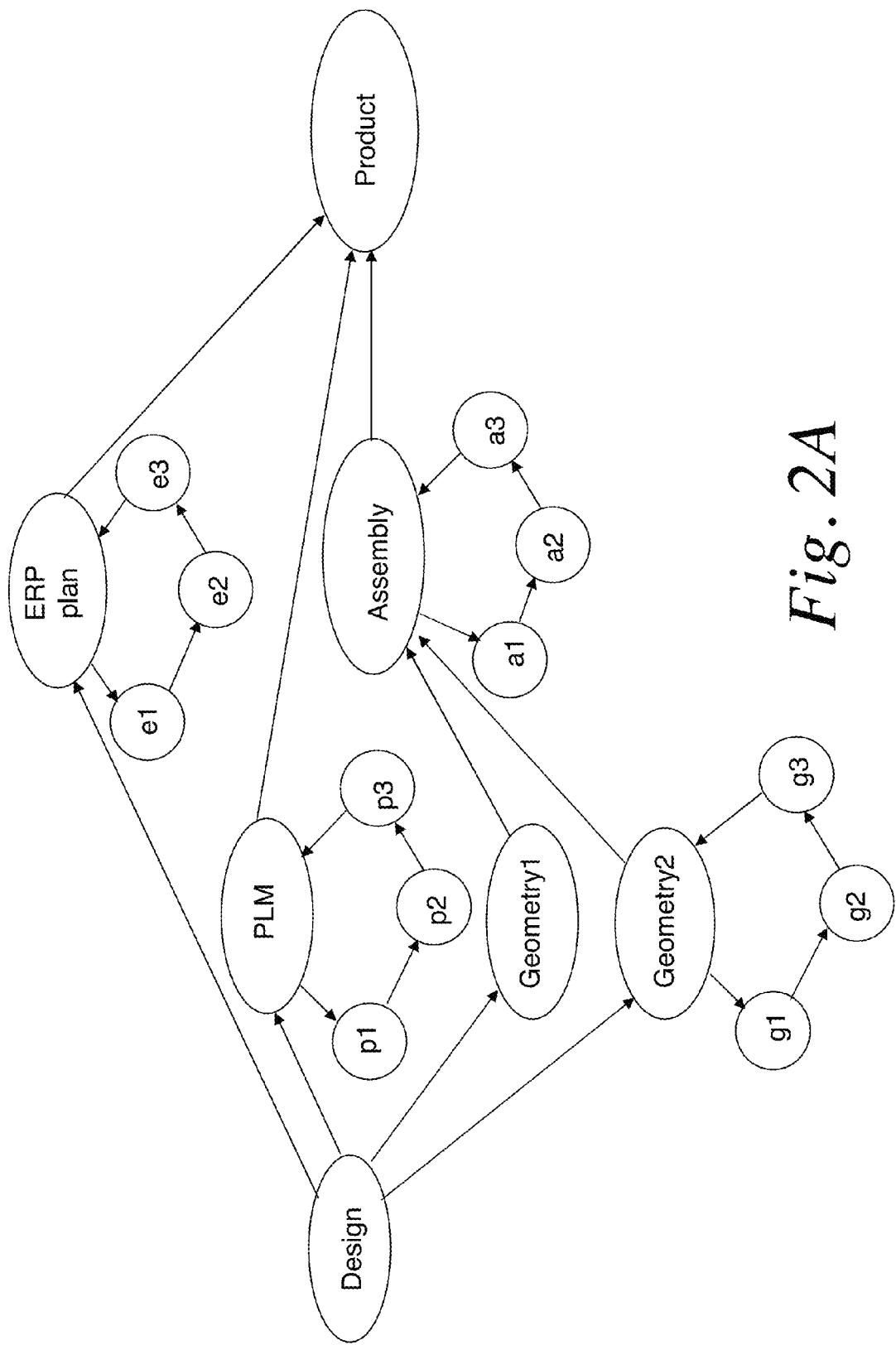
FIG. 2A is a block diagram of an embodiment of design flow between two conceptual endpoints.

B. Systems and Methods for Using and Managing a Common Data Model with a Plurality of Product Design Applications Product design typically involves many users and designers, using many different applications, over the course of development from a design concept to a finished product. Referring briefly to FIG. 2A, shown is a block diagram of an embodiment of design flow between two conceptual endpoints. Different applications, such as an Enterprise Resource Planning (ERP) application, a Product Lifecycle Management (PLM) application, a direct modeling computer-aided design (CAD) application or a parametric modeling CAD application to edit geometry, or a product assembly application may be used at various points in moving from design to product. Different applications are used depending on desired functionality, and have trade offs in ease of use, power, complexity, learning curves, and the ability to display information in various formats.

Figure 2B:
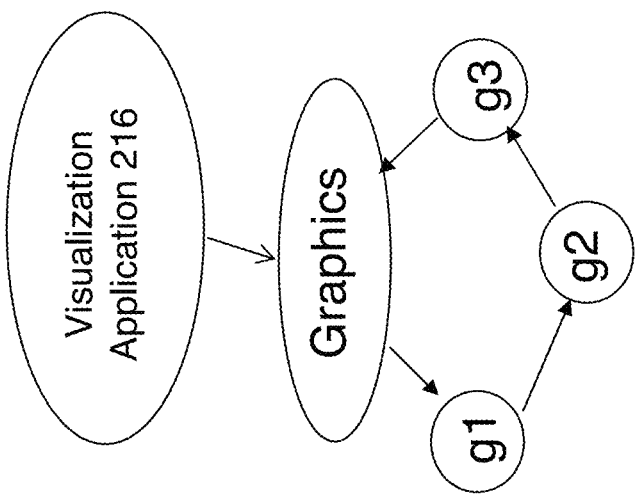
FIG. 2B is a block diagram of an embodiment of design changes to subparts of a common data model.
Figure 2B:
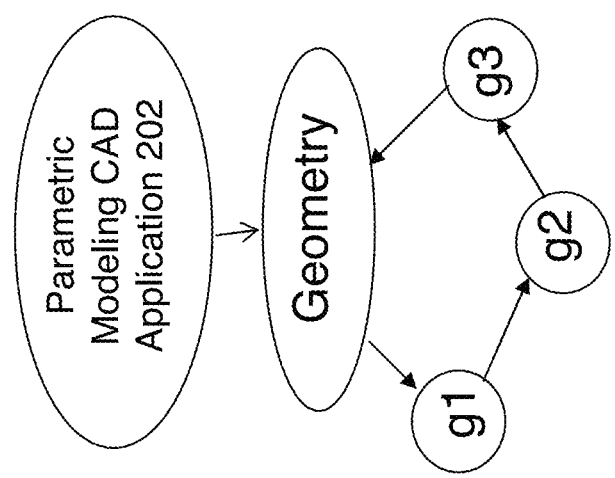

Still referring to FIG. 2A, various steps may be taken by a user of an application and modifications made to a design, such that the design proceeds through various versions (a1-a3; p1-p3; e1-e3; g1-g3) as it is modified. The set of paths between the two conceptual end points of design and product used in the course of a design may describe an "information item", which may be a subset of data of a product or model. For example, referring briefly to FIG. 2B, a user of a parametric modeling CAD application 202 (discussed in more detail below) may modify geometry data of a model, proceeding through one or more variations (g1-g3). Similarly, a user of a visualization application 216 (also discussed in more detail below) may modify graphics data of a model, proceeding through one or more variations (gr1-gr3).

When using separate data models and objects that are imported, exported, and translated between each application, information regarding design history and intent may be lost. Additionally, as multiple users work on a model, many different versions may be created, with no indication of which versions of which subsets of data are current or at equivalent phases in the design process. For example, a designer may generate geometry of a model and pass the model to an engineer for analysis and a sales representative for getting potential customer feedback, creating three different versions of the model (one version in a format usable by a CAD modeler, one version in a format usable by an engineering analysis program, and one version in a format usable by a visualization and annotation application). The sales representative may make annotations to the model, creating a fourth version, and export the annotated model back into a format usable by the designer, creating a fifth version. The engineer may make various modifications to the model to comply with engineering standards, creating a sixth version. If the engineer then exports this standard-compliant version to a format usable by the sales representative for viewing and annotation, there could quickly be a dozen different versions of the model, requiring careful bookkeeping in the organization to ensure that models being worked on and passed around are "current".

Figure 2C:
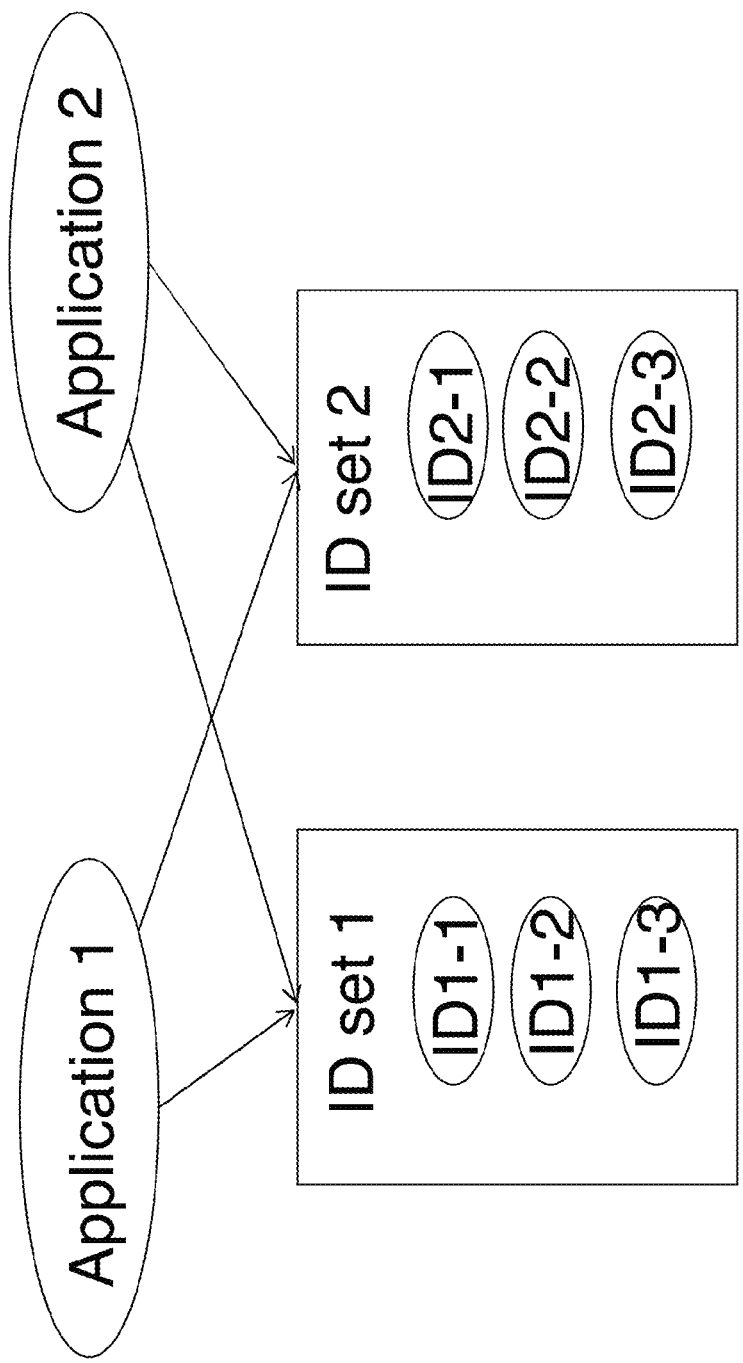
FIG. 2C is a block diagram of an embodiment of identifying changes to a common data model.

One solution for consistency management is to use a common data model between the applications, such that the object does not need to be translated. A further solution is to include multiple sub-parts of the object or "chapters" directed to various aspects of the product model, such as geometry data and graphics. In an embodiment of this solution, discussed in more detail below, a product model using a common data model does not need to be passed between multiple applications and synchronized, because the applications can work on sub-parts of the same product model. Shown in FIG. 2C is a block diagram of an embodiment of identifying and storing changes to sub-parts of a common data model. In brief overview, each information item or aspect of the product model, such as geometry or assembly information, include a set of identifiers or IDs. The IDs represent a path or set of changes to an information item performed by one or more applications. In some embodiments, an ID can be shared or modified by many applications. An application may modify an information item by inserting or deleting IDs. In some embodiments, each ID or sub-part of an ID corresponds to a version of the information item, and may correspond to or be associated with data representative of the version, which may comprise a full set of the data or a delta or different set from a prior version.

As mentioned above and referring briefly back to FIG. 2B, an ID may be shared by multiple applications. For example, in one embodiment, the parametric modeling CAD application 202 may share IDs with the visualization application 216. This may be done, for instance, because of the relationship between graphics and geometry data of the model or a dependency of the graphics data on the geometry data.

Figure 2D:
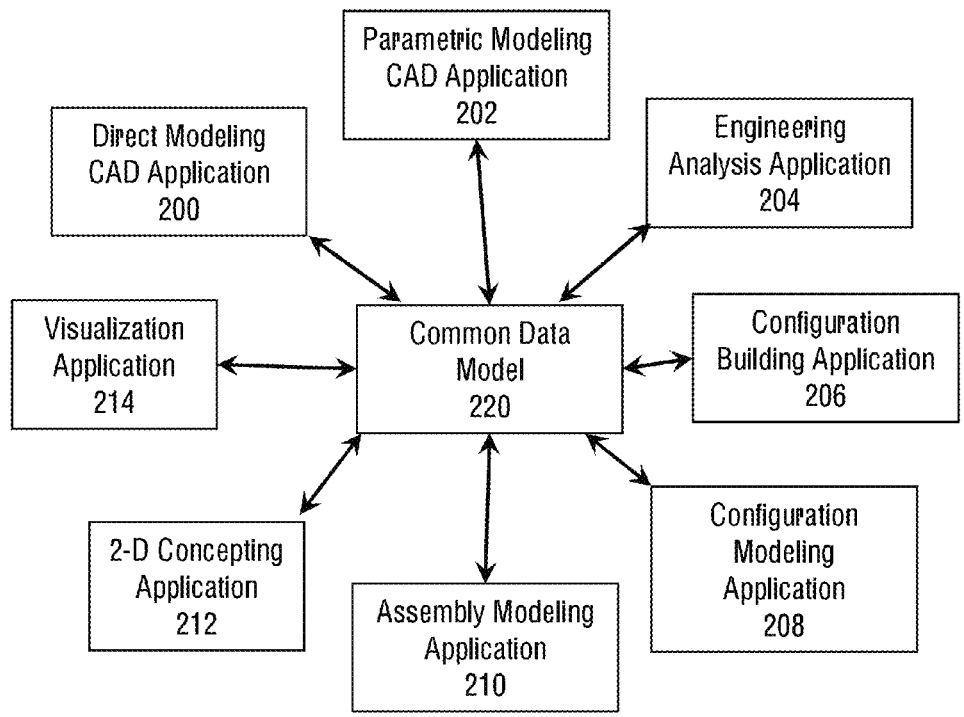
FIG. 2D is a block diagram of an embodiment of a suite of applications using a common data model.

FIG. 2D is a block diagram of an embodiment of a suite of applications using a common data model 220. In brief overview the suite of applications may include some or all of: a direct modeling CAD application 200, a parametric modeling CAD application 202, an engineering analysis application 204, a configuration building application 206, a configuration modeling application 208, an assembly modeling application 210, a 2-dimensional or 2-D concepting application 212, and a visualization application 214, which may all use a common data model 220.

Still referring to FIG. 2D and in more detail, in some embodiments, the suite may include a direct modeling CAD application 200. In one embodiment, a direct modeling CAD application 200 may comprise a program, application, service, or executable code for direct manipulations of geometric data of a model. Accordingly, engineers need not consider design intent and associations of elements. This may allow for rapid development cycles and quick creation of custom or one-off products, as well as construction of very large, highly detailed assemblies. Although referred to herein as direct modeling, this technique is sometimes called explicit modeling. One of skill in the art can appreciate that, regardless of the term used, direct or explicit modeling is a geometry-based paradigm for direct manipulation of geometry, agnostic or ignorant of design intent, history, and associative relationships. Direct modeling should not be confused with direct design manipulation, which refers to manually pushing, pulling, or modifying geometry as opposed to entering data into a dialog box to edit geometry, sometimes referred to as indirect design manipulation. Direct design manipulation and indirect, or dialog box, design manipulation thus refer to methods of inputting data in a user interface; while direct or explicit modeling and parametric modeling thus refer to a modeling paradigm.

In some embodiments, the suite may include a parametric modeling CAD application 202. In one embodiment, a direct modeling CAD application 200 may comprise a program, application, service, or executable code for feature-based manipulations of geometric data of a model. In parametric modeling, sometimes referred to as associative parametric modeling, feature-based modeling, or history-based modeling, geometry is created through a two-step process. The user defines geometry construction recipes through the use of feature constructs, including extrusions, holes, cuts, fillets, chamfers, rounds, and others. The parametric geometry engine interprets these recipes and creates the geometry of the model for display by a modeling or display engine. These recipes may sometimes be referred to as feature histories, and may comprise a sequence of the different combinations of features utilized in modeling a final modeled object as the modeled object is designed.

Unlike direct modeling, because parametric modeling stores an order of operations or history, relationships between features may be defined. Accordingly, changing the order of features in the recipe may have dramatic effects on the model, unlike in direct modeling, where the order of element creation is irrelevant. However, this approach allows a user to edit an earlier feature in the instruction list, and the geometry engine will recalculate the effects through the model. For example, in a parametric CAD modeler, if a user creates an extruded plate and defines a hole as centered on the midpoint of an axis of the plate and later changes the dimensions of the plate, the geometry engine may move the hole to remain centered on the midpoint. However, in a direct CAD modeler, stretching a face of the plate after placing the hole may result in the hole not moving and being located off-center.

In some embodiments, the suite may include an engineering analysis application 204. In one embodiment, an engineering analysis application 200 may comprise a program, application, service, or executable code for performing analysis on a model, including linear static, modal, buckling, contact, and steady state thermal analysis types, mapped to underlying CAD geometry. For example, in one embodiment, a user of engineering analysis application 200 may determine a mass or center of gravity of a three dimensional model.

In some embodiments, the suite may include a configuration building application 206. In one embodiment, a configuration building application 206 may comprise a program, application, service, or executable code for creating, interpreting and/or modifying project proposals, concept and market requirements, bill-of-materials (BOM) changes, design feedback, customization options, variant selection, or other product configuration information. In some embodiments, the configuration building application 206 may enable component objects to be combined into simple or elaborate structures for producing an end product. In one embodiment, a configuration building application 206 may comprise part of a product development system (PDS).

In some embodiments, the suite may include a configuration modeling application 208. In one embodiment, a configuration modeling application 208 may comprise a program, application, service, or executable code for performing visualization and mock-up of a custom configuration of a product design. In some embodiments, configuration modeling application 208 may comprise functionality for outputting a bill-of-materials, cost proposal, documentation, or other information relating to a selected configuration of a product.

In some embodiments, the suite may include an assembly modeling application 208. In one embodiment, an assembly modeling application 208 may comprise a program, application, service, or executable code for visualizing and analyzing a virtual assembly of a plurality of modeled objects or components of a product. For example, in one embodiment, a user may use an assembly modeling application 208 to investigate how various parts of a product, such as the back plate, face plate, keypad, screen, antenna, battery, and internal circuit boards of a cellular phone will fit together. In some embodiments, the user may use the assembly modeling application with multiple CAD files that represent individual components within a product. In one embodiment, the assembly modeling application may present a reduced subset of the data of a CAD model to a user, for speed and efficiency of processing, such as a shell or outer surface of the model. In some embodiments, the assembly modeling application may utilize absolute or relative positioning information for parts of the product model, or may position components responsive to constraints. For example, in one such embodiment, a screw hole on a faceplate may be constrained to be adjacent to and axially aligned with a corresponding tapped hole on a backplate.

In some embodiments, the suite may include a 2-dimensional (referred to variously as 2-D or 2D) concepting application 212. In one embodiment, a 2-dimensional concepting application 212 may comprise a program, application, service, or executable code for the creation, analysis and modification of 2-dimensional designs or sketches. In some embodiments, a user may use a 2-dimensional concepting application 212 to design a face of a product. The resulting 2-dimensional model may then be brought into a 3-dimensional modeler such as direct modeling CAD application 200 or parametric modeling CAD application 202 and extruded or pulled into three dimensions.

In some embodiments, the suite may include a visualization application 214. In one embodiment, a visualization application 214 may comprise a program, application, service, or executable code for visualizing, annotating and manipulating a CAD model. In many embodiments, visualization application 214 may allow a manager to view parts of a model created by an electrical engineer in an electrical CAD (ECAD) application, and those created by a mechanical engineer in a mechanical CAD (MCAD) application, regardless of the different capabilities of these applications. Visualization applications may provide functionality for viewing large, complex assemblies and models. Because the visualization application is not performing parametric regeneration, processing requirements are reduced, and accordingly larger and more complex models may be displayed and manipulated. In many embodiments, visualization application 214 may comprise functionality for displaying a dynamic or animated model.

In some embodiments, each application 200-214 in the suite may utilize a common data model 220. In one embodiment, and discussed in more detail below, the common data model 220 may comprise one or more information items, as discussed above, including 2D and 3D geometry data; analysis data; appearance data including material selection, texture and paint options; annotation data; and component placement data. In some embodiments, these one or more information items may be referred to as chapters, and may be presented to or modified by different applications on a chapter basis.

Synchronizing modifications to a common data model object as it is concurrently modified by a plurality of users in different applications may be crucial to managing development of a product design. As discussed above, typically, detailed bookkeeping is required to ensure that users are working on a current model. This is inefficient, and errors may result in versions being overlooked. However, it may be observed that during development, a product design passes through several distinct phases from conceptual design to end product. These phases may include design, prototyping, analyzing, redesigning, alpha or beta testing, component manufacturing, and assembling. During each phase, multiple users may make different variations to the model. However, typically each phase must be completed before the next phase may be begun. For example, a prototype cannot be constructed until at least a first stage of designing has been completed. Accordingly, at the beginning of each phase, different chapters of a common data model object may be said to be synchronized or equivalent. Furthermore, with each phase, different sub-phases may be recognized with the same model. Accordingly, different chapters of a common data model may be said to be synchronized where all variations are at an equivalent stage of product development.

Figure 2E:
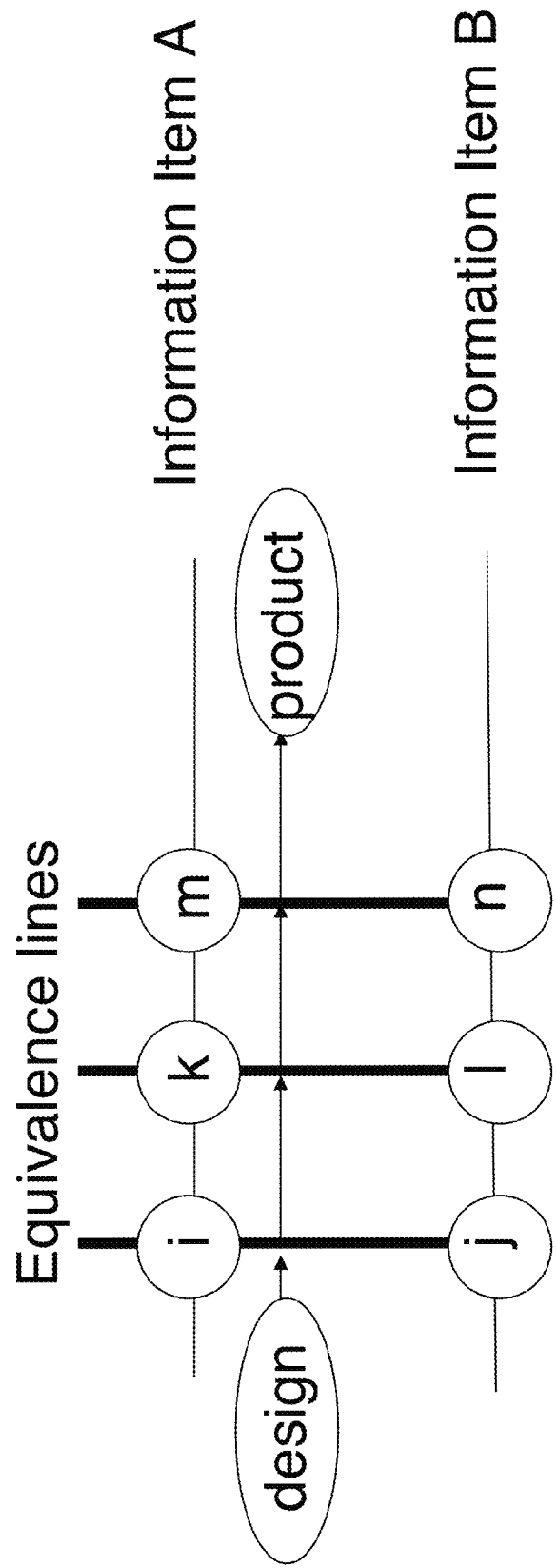
FIG. 2E is a sequence diagram of an embodiment of managing synchronization of a plurality of information items in a common data model.

Referring to FIG. 2E, shown is a sequence diagram of an embodiment of managing synchronization of a plurality of information items in a common data model. In brief overview, a model comprises a plurality of information items (A and B). As the model goes from design to end product, modifications are made to chapters and information items in the design in various applications. At certain stages in these modifications, information item A may be consistent with information item B, such as i and j, k and l, and m and n. These may be referred to as equivalence lines, which represent the compatible set of information item versions.

Figure 2F:
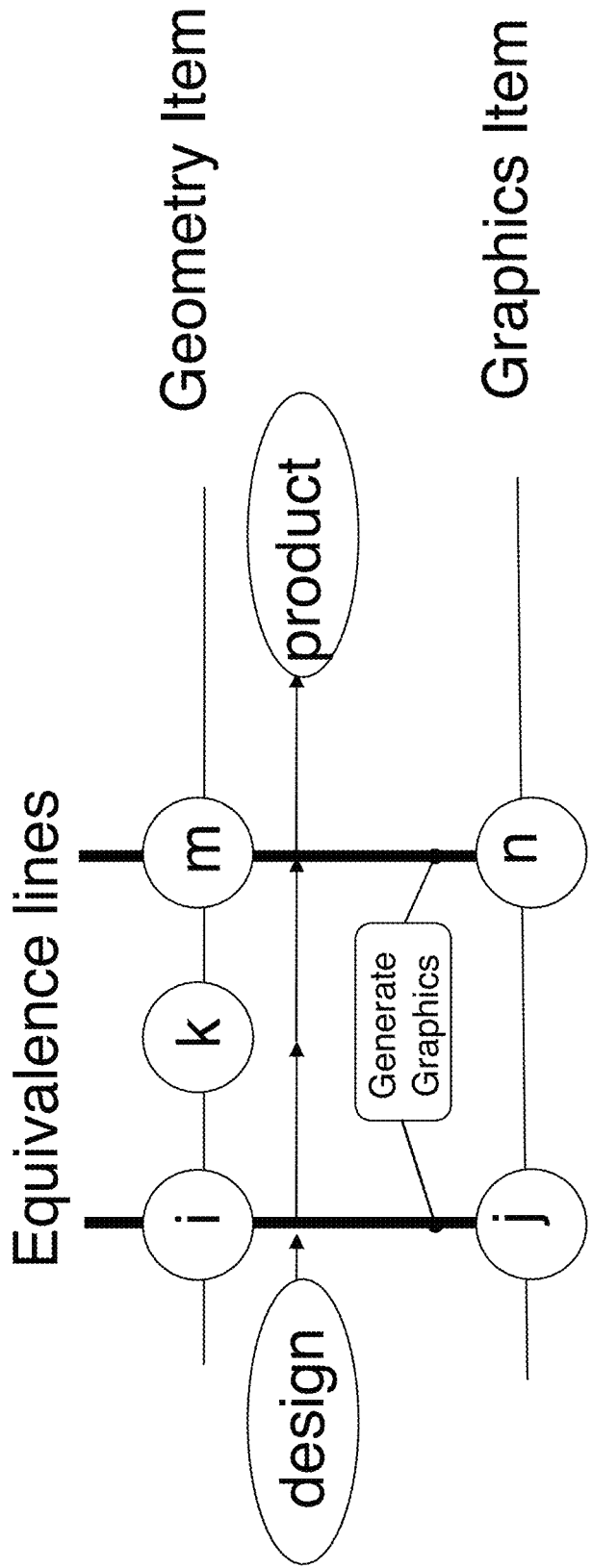
FIG. 2F is a sequence diagram of an example of an embodiment of managing synchronization of a plurality of information items in a common data model.

Referring now to FIG. 2F, shown is a sequence diagram of an example of an embodiment of managing synchronization of a plurality of information items in a common data model. In the example shown, the model is in a consistent state at a first time with geometry i and graphics j on a first equivalence line. A user makes a modification to the geometry data, moving to geometry k, which is no longer consistent or compatible with graphics j. The user makes another modification to the geometry data, moving to geometry l. Responsive to either the modification to the geometry data or an indication from the user that the geometry has reached a predetermined stage matching a second equivalence line, either the system, the user, or another user updates or generates new graphics data m, consistent with geometry l. The model is again in a consistent state on the second equivalence line.

In some embodiments, one or more applications of the application suite may create lines of equivalence. For example, in one such embodiment, a direct or parametric modeling CAD application may modify geometry data and create a new line of equivalence. Responsive to the new line of equivalence, other applications such as product visualization application or engineering analysis application may update or regenerate graphics or analysis data according to the geometry data at the new line of equivalence, to reach a consistent state in the model. In some embodiments, lines of equivalence may be created by the model reaching a predetermined state, such as beta testing or prototyping, or responsive to a command from a user, such as a command to synchronize the chapters of the common data model object. In other embodiments, lines of equivalence may be created periodically, responsive to saving or exiting a program, or responsive to a substantive change to the model.

Figure 2G:
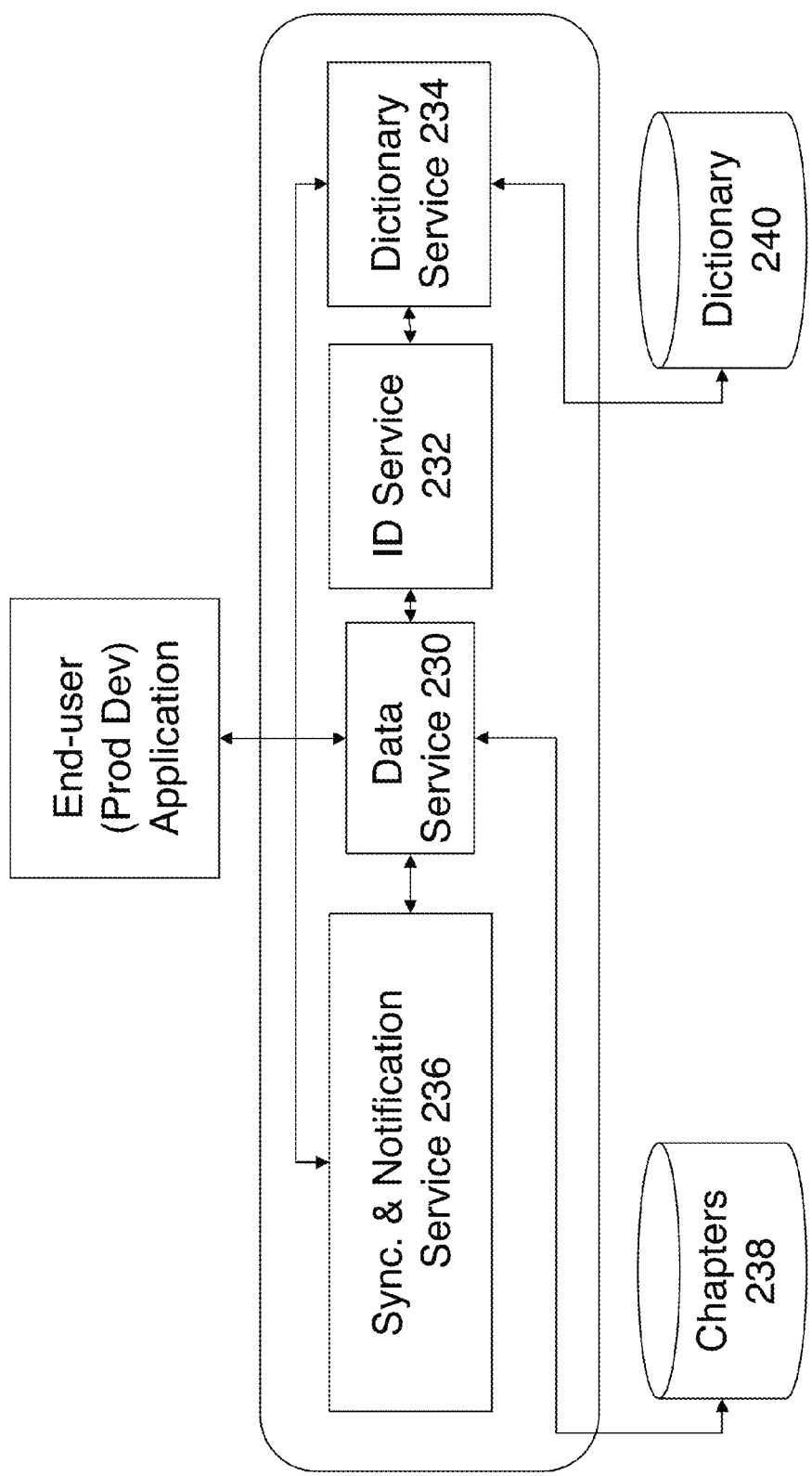
FIG. 2G is a block diagram of a framework for managing use and synchronization of a common data model.

FIG. 2G is a block diagram of a framework for managing use and synchronization of a common data model. In brief overview, in some embodiments, the framework may comprise one or more of a data service 230, an ID service 232, a dictionary service 234, a synchronization and notification service 236, data chapters 238, and a dictionary 240, and communicate with one or more product development applications 200-214 of the product development suite.

Still referring to FIG. 2G and in more detail, in some embodiments, a data service 230 may comprise a library, application programming interface (API), service, logic, or executable code for translating and managing access to one or more chapters 238 of a common data model object by one or more applications or other services. In some embodiments, data service may manage, create, or modify headers or data of the common data model associated with an object. In one embodiment, each chapter may include a header or "table of contents," which may comprise a relational database, file, XML file, registry, library, or list of IDs for maintaining the consistency of the chapter and object. In another embodiment, each chapter may include a body with chapter-specific data of the object, such as geometry data or graphics data.

In some embodiments, ID service 232 may comprise a library, API, service, logic, or executable code for creating and managing IDs. As discussed above, in some embodiments, applications may inform other applications of modifications to a chapter or object by creating or modifying IDs in the ID set of the object. In one embodiment, ID service 232 comprises an API for creating and modifying these IDs.

In some embodiments, dictionary service 234 may comprise a library, API, service, logic, or executable code for managing dictionary 240, and information items and lines of equivalence. In one embodiment, dictionary service 234 may comprise an API for an extensible common dictionary, and may manage definitions of information-item types, such as graphics and geometry, and definitions of applications that create lines of equivalence. For example, as discussed above, a parametric CAD modeling application may modify features of an object, moving the object into a new state or version. This may create a new line of equivalence, and may instruct or direct other applications to generate corresponding and consistent or equivalent data for other information items.

In some embodiments, chapters 238 and dictionary 240 may comprise libraries, databases, flat files, registries, or any other type and form of data stored in a storage device on or accessible by the computing device, such as a centralized common storage, cloud-based storage, or other network storage. As discussed above, one or more chapters 238 may comprise an object, and may themselves include a header or table of contents of identifiers and a body of information items or data. Dictionary 240 may comprise an extensible common dictionary, and may include definitions of information-item types, such as graphics and geometry, and definitions of applications that create lines of equivalence.

FIG. 3A is a comparison diagram of usage of different chapters of a common data model by a plurality of applications. In brief overview, in one embodiment, different common data model objects 300, such as parts, assemblies, drawings, 2-D concepting drawings, and visualization models may include different common data model chapters 302. One skilled in the art may readily appreciate that some objects do not require every chapter 302. For example, as a simple two-dimensional sketch, a 2-D concepting drawing may utilize both geometry data and annotation data, but analysis data may be meaningless without a third dimension to describe solids, rather than planes.

In the embodiments shown in FIG. 3A, a CDM part object may include geometry, analysis, appearance, and annotation chapters. A CDM assembly object may further include a component placement chapter. Although only five different chapters 302 are shown in the example, in many embodiments and as an advantage of the extensible dictionary discussed above, further chapters of information items may be included in any object.

As shown, in many embodiments, different applications 200-214 may read different chapters 302 of different objects 300. For example, as discussed above, it may be meaningless for an engineering analysis application 204 to analyze engineering data of a two-dimensional surface. Similarly, a 2-D concepting application 212 may lack sufficient tools to properly interact with three-dimensional models, assemblies, drawings, and parts.

Figure 3B:
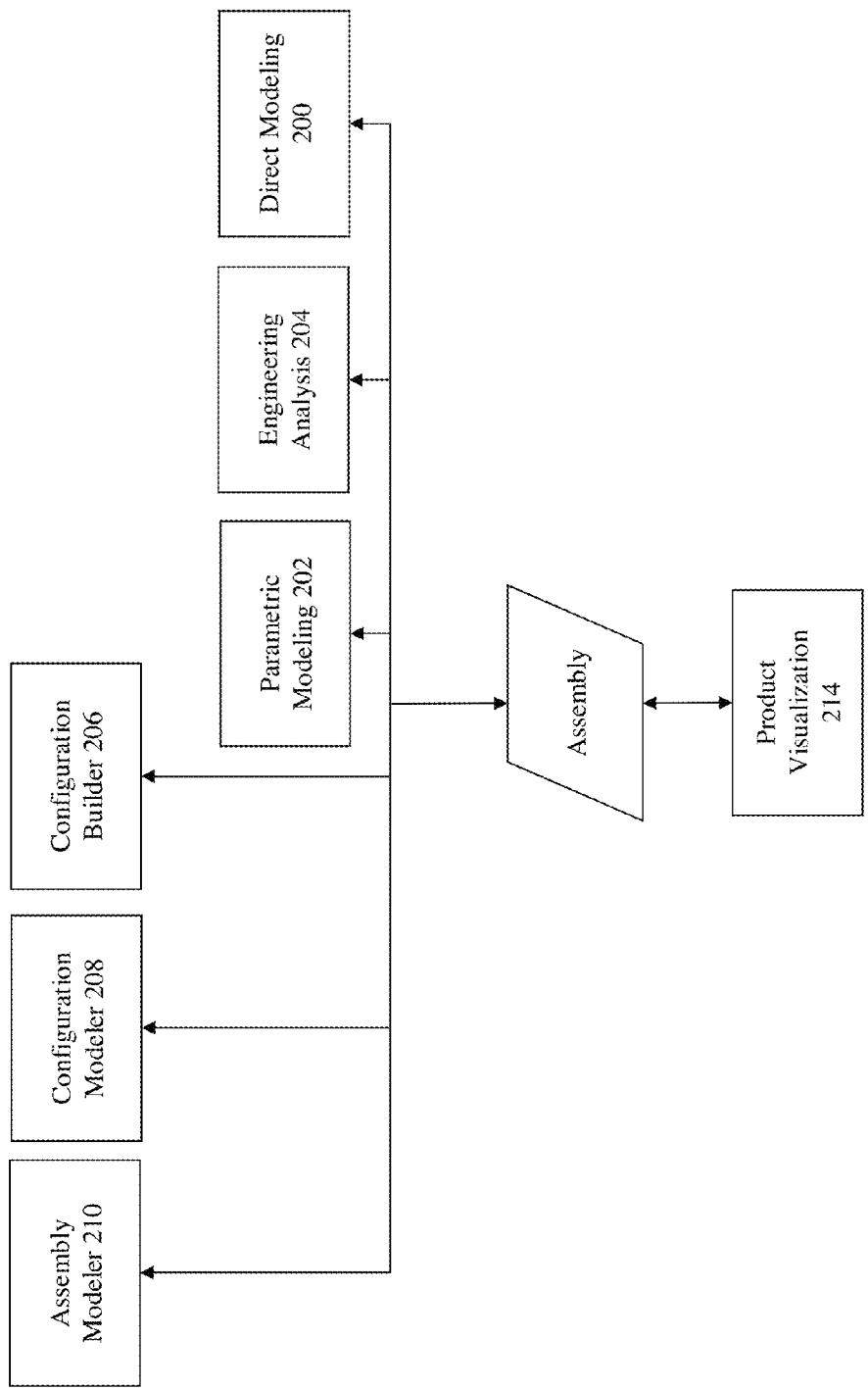
FIGS. 3B-3E are context diagrams of embodiments of examples of interaction with different chapters of a common data model by a plurality of applications.
Figure 3C:
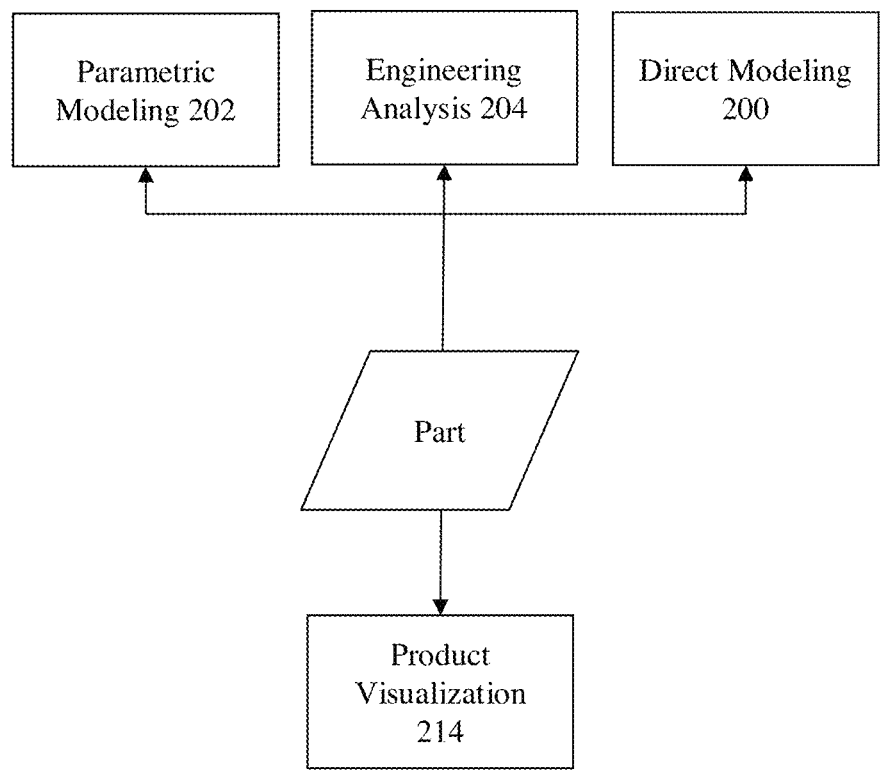
Figure 3D:
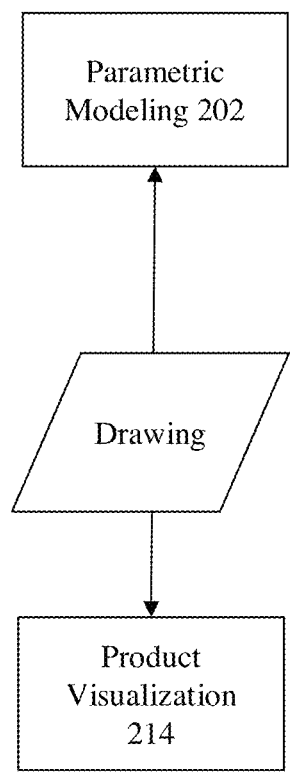
Figure 3E:
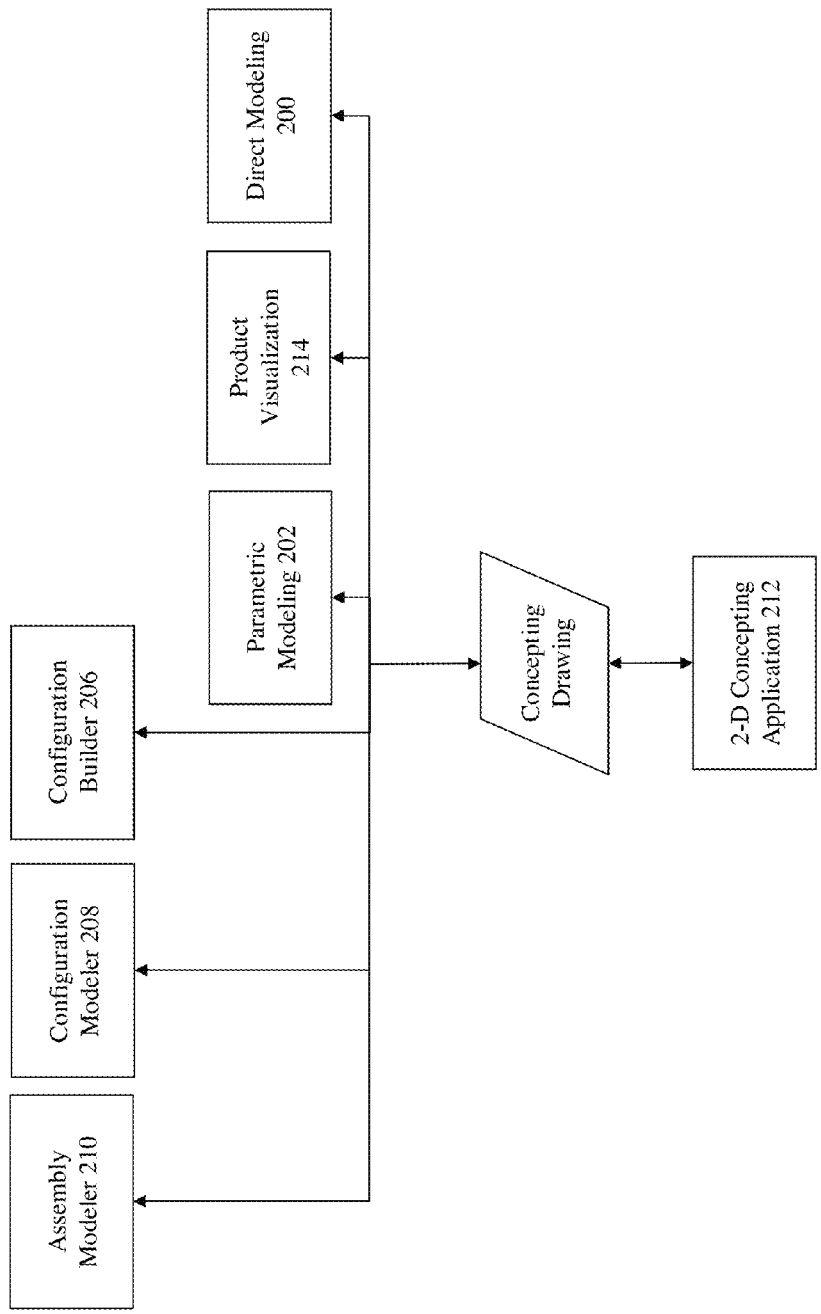

FIG. 3A may be displayed in an alternate view, on an object by object basis. For example, FIGS. 3B-3E are context diagrams of embodiments of examples of interaction with different chapters of a common data model by a plurality of applications. In brief overview, each of FIGS. 3B-3E illustrate different applications operating on the same CDM object 300. For example, FIG. 3B depicts a direct modeling application 200, a parametric modeling application 202, an engineering analysis application 204, a configuration building application 206, a configuration modeling application 208, an assembly modeling application 210, and a product visualization application 214 all interacting with a common data model assembly object. Similarly, FIG. 3C depicts applications interacting with a common data model part object; FIG. 3D depicts applications interacting with a common data model drawing object; and FIG. 3E depicts applications interacting with a common data model concepting drawing object.

Figure 4:
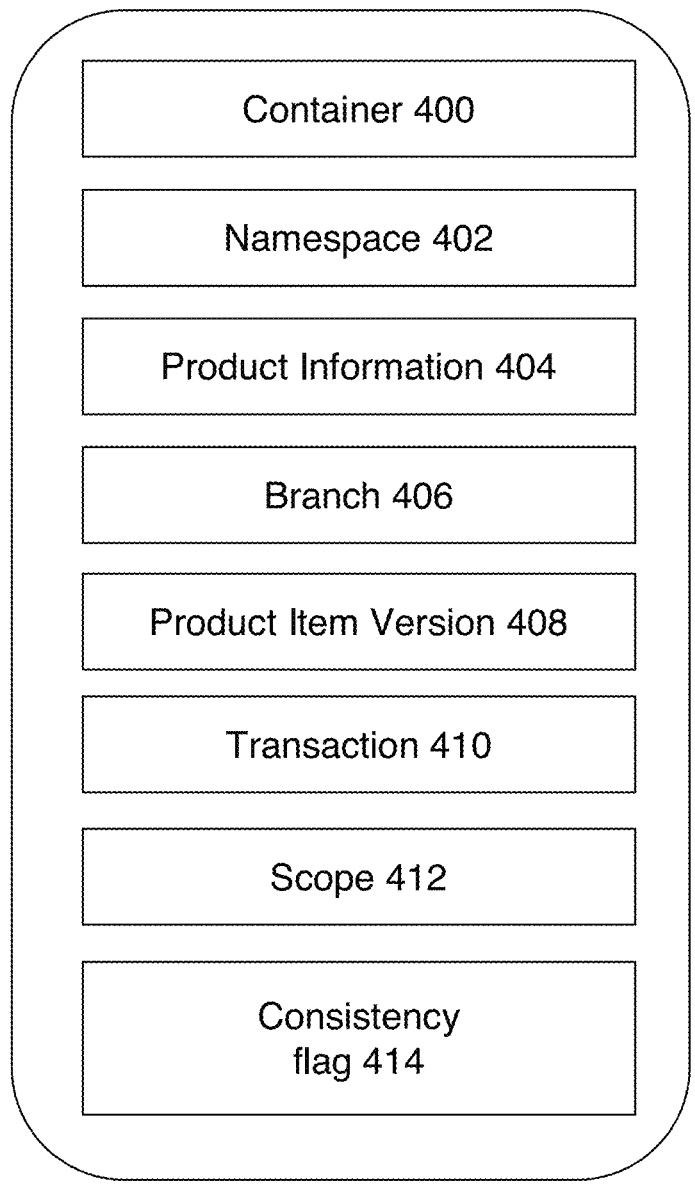
FIG. 4 is a block diagram of a change instruction for a common data model.

Referring now to FIG. 4, shown is a block diagram of an embodiment of an ID representative of a path or set of changes to an information item of a common data model chapter, sometimes referred to herein as a change instruction. In some embodiments, the change instruction may include identifiers of one or more of a container 400; namespace 402; production information 404; branch 406; product item version 408; transaction 410; scope 412; and consistency flag 414. As discussed above, each information item or aspect of the product model, such as geometry or assembly information, may include a set of identifiers or IDs. The IDs represent a path or set of changes to an information item performed by one or more applications. In some embodiments, a change instruction or ID can be shared or modified by many applications. An application may modify an information item by inserting or deleting IDs.

Still referring to FIG. 4 and in more detail, in one embodiment, a change instruction may include a container ID 400. Container ID 400 may comprise an identifier, address, pointer, or similar representation identifying a physical container of an information item, such as a folder or storage location.

In some embodiments, a change instruction may include a namespace 402. Namespace 402 may comprise an identifier, string, or other similar representation of a domain under which the information item is considered unique.

In one embodiment, a change instruction may include an identifier of product information (PI) 404. Product information 404 may comprise a string, identifier, or other data representation of the business name or intent of the information item.

In some embodiments, a change instruction may include an identifier of a branch 406. Branch 406 may comprise a string, identifier, index, pointer, address, parent-child relationship identifier, or other data format for a descriptor of a variant of an information item.

In one embodiment, a change instruction may comprise a product item version (PIV) identifier 408. A PIV identifier 408 may comprise a string, identifier, or other data representation identifying a specific version of the information item, as discussed above.

In one embodiment, a change instruction may comprise a transaction identifier 410. Transaction identifier 410 may identify one or more actions that caused the change instruction to be created. In some embodiments, the transaction identifier 410 may comprise a string, index, list, vector, or data file, and may include one or more of a time that the transaction occurred, an application that performed the transaction or created the change instruction, and a design intent of a user in performing the transaction. Such design intent may be set explicitly by the user or may be determined implicitly, such as in reference to one or more constraints created by the user.

In one embodiment, a change instruction may comprise a scope identifier 412. A scope identifier 412 may comprise an indicator, string, flag, bitmask, or other data representation to indicate whether the change instruction is internal, shared, or external. In one embodiment, an change instruction may be shared with other computing devices and/or other CAD applications on the same other computing devices. For example, another computing device serving as an intermediary, server, or central repository may be used for synchronizing changes to information items. Notifications of changes through the creation of change instructions may be transmitted to this intermediary, and other CAD applications and/or computing devices may request information about the changes. In one embodiment, such requests may be made responsive to a notification transmitted to the other CAD applications from a notification service executing on the server.

In another embodiment, the scope identifier 412 may be set to internal to allow a user to try different design changes, while retaining an ability to recover the original design. For example, in one embodiment, a user may modify one or many CAD objects of a plurality of interrelated CAD objects in a model, such that a modification made to one CAD object causes the system to regenerate or recalculate other, dependent objects. Traditional undo support is typically not available in such embodiments, because of the regeneration or recalculation: an undo may only undo the last step of such regeneration, rather than the initial modification that triggered the regeneration. Although referred to here as interrelated CAD objects, in many embodiments, these objects may be referred to as interdependent, associated, regeneratively associated, related, dependent, or by various other terms without limitation to indicate that a modification made to one CAD object causes the system to regenerate or recalculate other, dependent objects.

As a result, in one embodiment, the same system for notifying other CAD applications of modifications to a model may be used for retaining a history of changes internally in the application. With each modification, the CAD application may record an internal change instruction representative of the modification. Additionally, in one embodiment, the CAD application may first make a temporary copy of the beginning state of the model. Thus, each internal change instruction may represent a delta or difference from a previous modification, and the sum of all of the internal change instructions may represent a modification from a first, consistent state of the model on a first line of equivalence (e.g. the temporary copy) to a second state of the model on a second line of equivalence. While the change instructions are internal, the user may step forward or back through them, unapplying and applying one or more of the intermediate modifications to return to any intermediate, but consistent, state of design. Once the user accepts design changes as final, in one embodiment, the CAD application may merge the change instructions into a single shared or external change instruction. In other embodiments, the CAD application may merely modify the change instructions to be shared or external change instructions. The CAD application may then communicate the change instructions to a central server or intermediary, or other computing devices and/or CAD applications. In one embodiment, the CAD application may discard the temporary copy of the beginning state of the model.

In some embodiments, a change instruction may comprise a consistency flag 414. Consistency flag 414 may comprise a flag, string, bitmask, value, predetermined bit, or other data representative to indicate whether shared IDs of the chapter or object are in a consistent state or an inconsistent state. For example, in one embodiment, an application may create a change instruction to indicate that a new line of equivalence has been created, and the change instruction may include a flag indicating that the object or model is in an inconsistent state. Once all other information items have been updated to a consistent state, in some embodiments, the flag may be set to indicate that the object or model is in a consistent state. In still other embodiments, and referring briefly back to FIG. 2F, an application may create a change instruction with a consistency flag set to indicate an inconsistent state, not on a line of equivalence, such as geometry item k. Other applications need not update or regenerate other information items responsive to this change instruction. When the application creates another change instruction with a consistency flag set to indicate a consistent state, such as geometry item m, other applications may then regenerate other information items, such as graphics item n to reach the new line of equivalence.

Figure 5A:
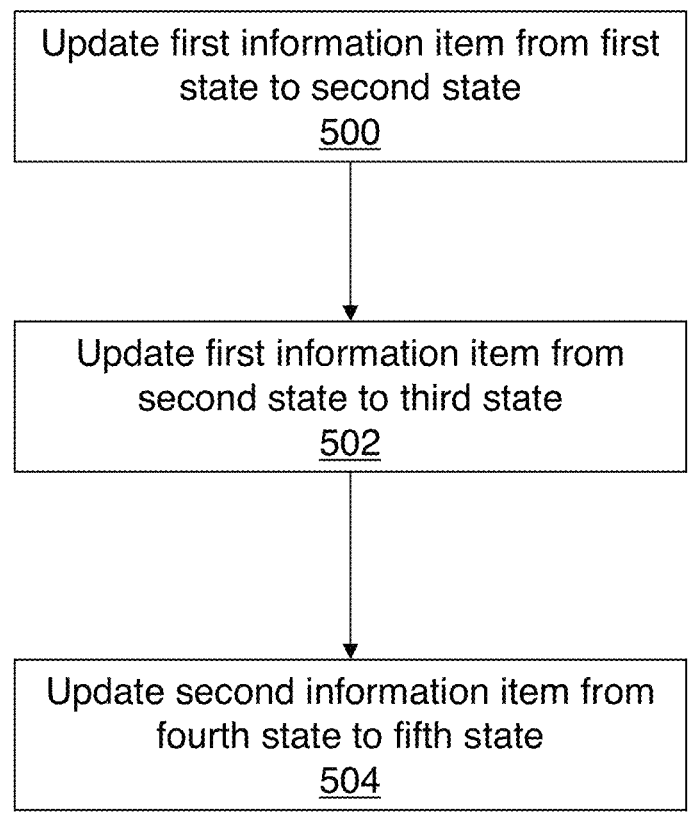
FIG. 5A is a flow chart of an embodiment of a method of managing synchronization of a plurality of information items of a computer-aided design data model at one of a plurality of predefined states in an object life cycle.

Referring now to FIG. 5A, shown is a flow chart of an embodiment of a method of managing synchronization of a plurality of information items of a computer-aided design data model at one of a plurality of predefined states in an object life cycle. In brief overview, at step 500, a user may update a first information item from a first state to a second state. At step 502, a user may update the first information item from a second state to a third state. At step 504, a second user may update a second information item from a fourth state, corresponding or equivalent to the first state, to a fifth state, corresponding or equivalent to the third state.

Still referring to FIG. 5A and in more detail, in one embodiment at step 500, a first user of a first application executed by a processor of a first computing device may update a first information item of a shared CAD data model from a first state to a second state. In one embodiment, the first state may correspond to a first state in an object life cycle. For example, in one such embodiment, the first state may correspond to an initial phase of design, prototyping, testing, or manufacturing, or any other phase of product development, or may correspond to a subset of one of these phases or any other phase of product development. In some embodiments, updating an information item may comprise modifying aspects of the information item, such as modifying geometry data or graphics data of the shared CAD data model. In other embodiments, updating an information item may comprise creating a new portion of a model. In one embodiment, updating the first information item initiates the creation of a change instruction or ID, as discussed above. Said change instruction may comprise instructions to allow a CAD application or other application to update an information item to an equivalent or corresponding state to the updated first information item. In some embodiments, the change instruction may be transmitted to another computing device, such as a second computing device used by a second user with a second CAD application, while in other embodiments, the change instruction may be transmitted to a server, intermediary, or central repository, referred to generally as an intermediary. Said intermediary may include a notification service for notifying one or more other users of one or more other computing devices that the first user's actions have created a change instruction. In a further embodiment, upon receipt of said notification, a second user or second computing device may request the change instruction from the intermediary. In one embodiment, the change instruction may comprise a flag set to a predetermined value to indicate that the information item is now in an inconsistent state, or a state not corresponding to a line of equivalence, as discussed above. In a further embodiment, receipt of the change instruction with the flag set to indicate the information item is in an inconsistent state may not cause other computing devices or users to update other information items.

At step 502, in some embodiments, the first user may update the first information item from the second state to a third state. In one embodiment, the third state may correspond to a second state in the object life cycle, such as an initial phase of design, prototyping, testing, or manufacturing, or any other phase of product development, or may correspond to a subset of one of these phases or any other phase of product development. In some embodiments, updating the first information item to the third state initiates the creation of a second change instruction or ID, as discussed above. As discussed above, in some embodiments, the second change instruction may be transmitted to other computing devices or to an intermediary, which may notify other computing devices of the change instruction and provide second the change instruction to said other computing devices, upon request. In one embodiment, the second change instruction may comprise a flag set to a second predetermined value to indicate that the information item is now in a consistent state, or a state corresponding to a new line of equivalence, as discussed above. In a further embodiment, receipt of the second change instruction with the flag set to indicate the information item is in a consistent state may cause other computing devices or users to update other information items.

At step 504, in some embodiments, a second user of a second CAD application of a second computing device may update a second information item of the shared CAD data model from a fourth state corresponding to the first state, to a fifth state corresponding to the third state. In one embodiment, updating the second information item in this way may allow the second information item to bypass a state corresponding to the second state. In some embodiments, the second user may update the second information item responsive to receipt of a change instruction with a flag set to indicate that the first information item is in a consistent state, and responsive to instructions in the change instruction, as discussed above.

Figure 5B:
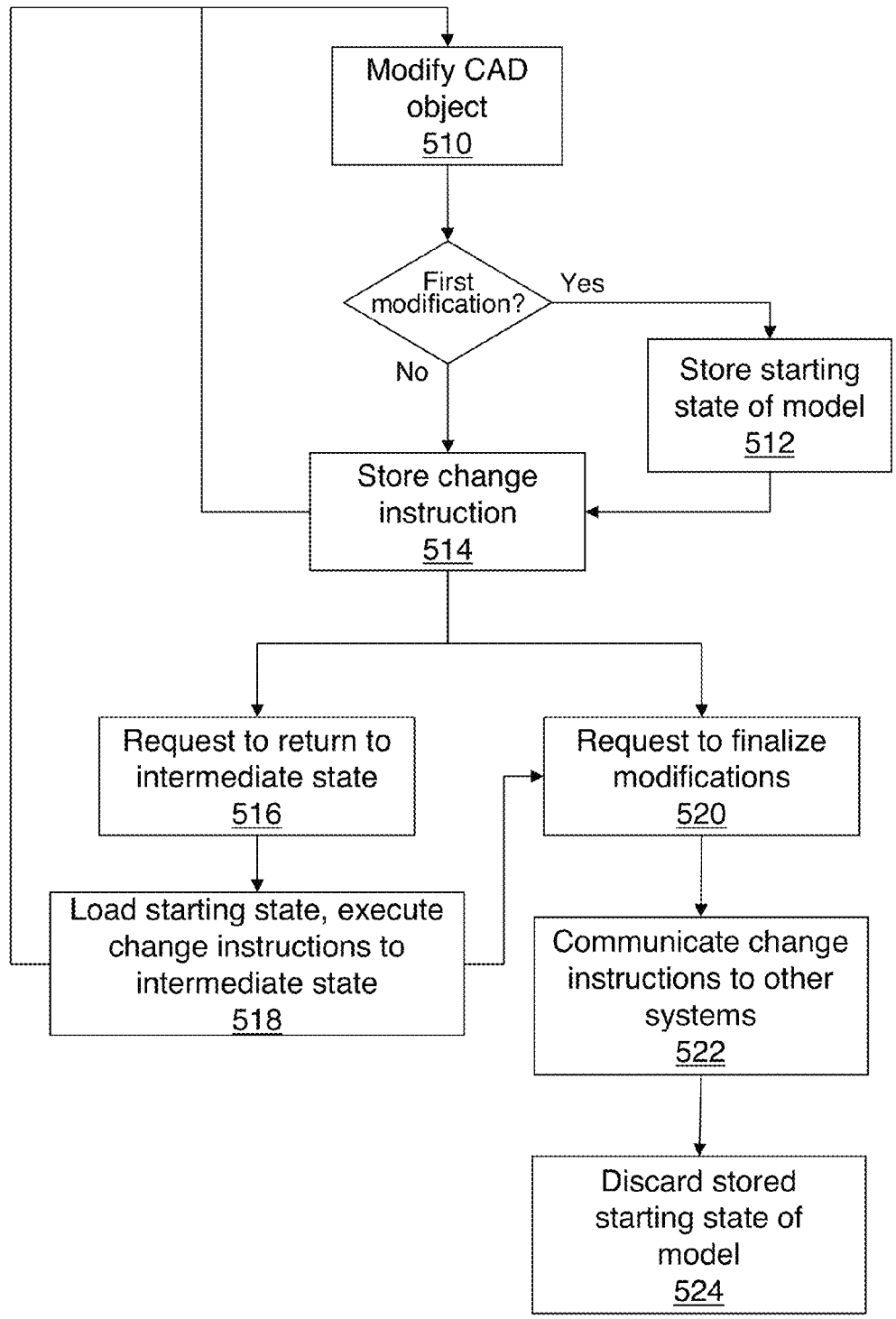
FIG. 5B is a flow chart of an embodiment of a method of managing multiple design steps of computer-aided design objects or models by a user.

Referring now to FIG. 5B, shown is a flow chart of an embodiment of a method of managing multiple design steps of computer-aided design objects or models by a user. In one embodiment, this method may allow a user to track changes to a CAD model that includes dependent regeneration of features, and undo through multiple user commands, regardless of the number of dependent features regenerated by the CAD application. This may also allow a user to attempt "what-if" scenarios, trying different modifications to a model and being able to return to any step in said modifications without having to save a copy of the model prior to each modification. As mentioned above, regular methods of undoing changes may not work, because in response to a single command from a user, a CAD application may regenerate or recalculate dozens of dependent features. A single undo may only be able to undo the last recalculation. Even with a system that stores multiple undos, it may be unclear to a user that they have to undo a dozen times to reach the modification that they performed, rather than recalculated modifications by the CAD application.

In brief overview, at step 510, a user may modify a CAD object using a CAD application. If this is the first modification to the CAD object since a previous finalization, at step 512, the CAD application may store a starting state of the CAD object or model. At step 514, the CAD application may create and store a change instruction representative of the modification. Steps 510-514 may be repeated iteratively. In one embodiment, at step 516, the user may request the CAD application to return to an intermediate state of the CAD model. Responsive to such request, at step 518, the CAD application may load the stored starting state and execute the one or more change instructions to bring the CAD model to the requested intermediate state. Steps 510-518 may then be repeated to explore different branches of modifications to the CAD model. In some embodiments, at step 520, the user may decide to keep the current state of the CAD object and issue a request to the CAD application to finalize the modifications. Responsive to the request, the CAD application may communicate the change instructions to other systems at step 522, and at step 524, the CAD application may discard the stored starting state of the CAD model.

Still referring to FIG. 5B and in more detail, at step 510, a user of a CAD application executing on a first computing device may modify a first CAD object of a plurality of interrelated CAD objects of a CAD model. In one embodiment, CAD objects of a CAD model are interrelated where a modification to one object causes the CAD application to recalculate or regenerate one or more other CAD objects in the CAD model. In one such embodiment, responsive to the user modifying the first CAD object, the CAD application may regenerate data of a second CAD object of the plurality of interrelated objects, the second CAD object dependent on the first CAD object. In some embodiments, the user may modify one or more information items of the CAD object, including geometry data, annotation data, assembly data, concepting data, material data, analysis data, appearance data, or any other type and form of data of the CAD object or model.

If the modification at step 510 is the first modification to the CAD object or first modification since a prior finalization of modifications, then at step 512, the CAD application may store a starting state or first state of the model. The starting state of the model may comprise data of the plurality of interrelated CAD objects of the CAD model prior to the modification by the user. Although referred to as a starting state or first state, one of skill in the art may appreciate that the starting state or first state may refer simply to a state prior to executing one or more modifications to the model.

At step 514, the CAD application may store a change instruction representative of the modification to the first CAD object by the user. In one embodiment, the change instruction may represent only the modification to the first CAD object by the user, regardless of the number of other objects that are dependent on the first CAD object and regenerated or recalculated by the CAD application. This may be done because the additional information may not be needed: if the CAD application executes the change instruction, it may automatically regenerate or recalculate data of the other dependent objects. Thus, the instruction to change the first object contains all information necessary to modify the model to a regenerated state after the user's modification. In one embodiment, the change instruction may include a flag, string, or bitmask set to indicate that the change instruction is an internal change instruction. In a further embodiment, responsive to the change instruction being identified as an internal change instruction, the CAD application may not communicate the change instruction to an intermediary or another computing device or CAD application. This may be done to prevent needless recalculation and regeneration by other CAD applications for modifications and "what-if" branches that the user decides to discard.

Steps 510-514 may be repeated one or more times, generating additional change instructions, and modifying the same CAD object or a different CAD object. In some embodiments, each change instruction represents a difference or delta from a previous state of the CAD model or object. For example, a first change instruction may represent an extrusion of a face made by a user. A second change instruction may then represent a chamfer of the extruded face. A third change instruction may then represent a notch or cut into the chamfered surface of the extruded face. Accordingly, each instruction may be based on the result of a previous change instruction. One skilled in the art may readily appreciate how execution of each change instruction in order may result in following the steps made by the user to bring the CAD model from the starting state to a present state. At step 516, in some embodiments, the user may request to return to an intermediate state of the CAD model. This may be done, for example, because the user decides not to keep one or more recent modifications to the CAD objects. In one embodiment, the user may select through a user interface to return to the intermediate state. In a further embodiment, the user interface may present a chain, tree, branching chain or other depiction of the various change instructions, allowing a user to select any intermediate state of the CAD model to return to.

At step 518, responsive to the request from the user to return to the intermediate state, the CAD application may load the stored starting state and execute one or more change instructions leading from the starting state in the chain or tree to the requested intermediate state. Executing each change instruction may comprise performing, by the CAD application, the modification made by the user to a CAD object and regenerating or recalculating dependent CAD objects of the plurality of interrelated CAD objects of the model.

Steps 510-518 may be repeated iteratively in many embodiments. After either step 514 or step 518, in some embodiments, the user may request to finalize modifications to the CAD model at step 520. Although referred to as finalizing, as used here, this term means finalizing modifications made to the model since storing the starting state. One of skill in the art may readily appreciate that the user may return to the model to make more modifications at a future time, at which point a new "starting state" may be stored.

Responsive to the request, at step 522, the CAD application may communicate one or more change instructions leading from the starting state in the chain or tree to the present state of the CAD model to one or more other CAD applications, computing devices, or a server, intermediary, or central repository of change instructions. In one embodiment, communicating the one or more change instructions may comprise modifying a flag, bitmask, or string of each change instruction identifying the change instruction as an internal change instruction to identify the change instruction as shared or external. As discussed above, in some embodiments, responsive to receiving the one or more communicated change instructions, the one or more other CAD applications, or computing devices may execute the change instructions and regenerate or recalculate data to modify information items of the shared CAD model to a consistent state. For example, having made multiple modifications to the geometry of a shared CAD model, the first user may finalize the modifications. The change instructions may be communicated to another application, such as an engineering analysis application, which may execute the change instructions and recalculate engineering data of the model, such as the location of a center of mass. As discussed above, in some embodiments, communicating the change instructions may comprise sending a notification to other systems that a new change instruction exists, and providing or transmitting the change instruction on request by the other systems. Such notification and transmittal may be performed by an intermediary or central repository, as discussed above.

At step 524, in some embodiments, the CAD application may discard the stored starting state of the model. In another embodiment, the CAD application may discard one or more change instructions, such as change instructions of alternate branches or design states past the finalized intermediate state.

Change instructions may also be used between a plurality of users working concurrently on a model to allow collaboration. Furthermore, in some embodiments, they may be used to reduce the amount of regeneration needed during designing of a model. For example, in one such embodiment, a first user may be working on a first portion of a design, such as an engine model for a truck. A second user may be working on a second portion of the design, such as a passenger compartment layout. In systems that require constant synchronization, many updates would be sent between the two users' CAD applications regardless of the fact that they may not be concerned with those updates at the moment. In such embodiments, because of the lightweight notification service described above and the ability to request and execute change instructions at any time, from a starting consistent state of the CAD model, the users may disregard change instructions until they are ready to update their model to a new consistent state.

Figure 5C:
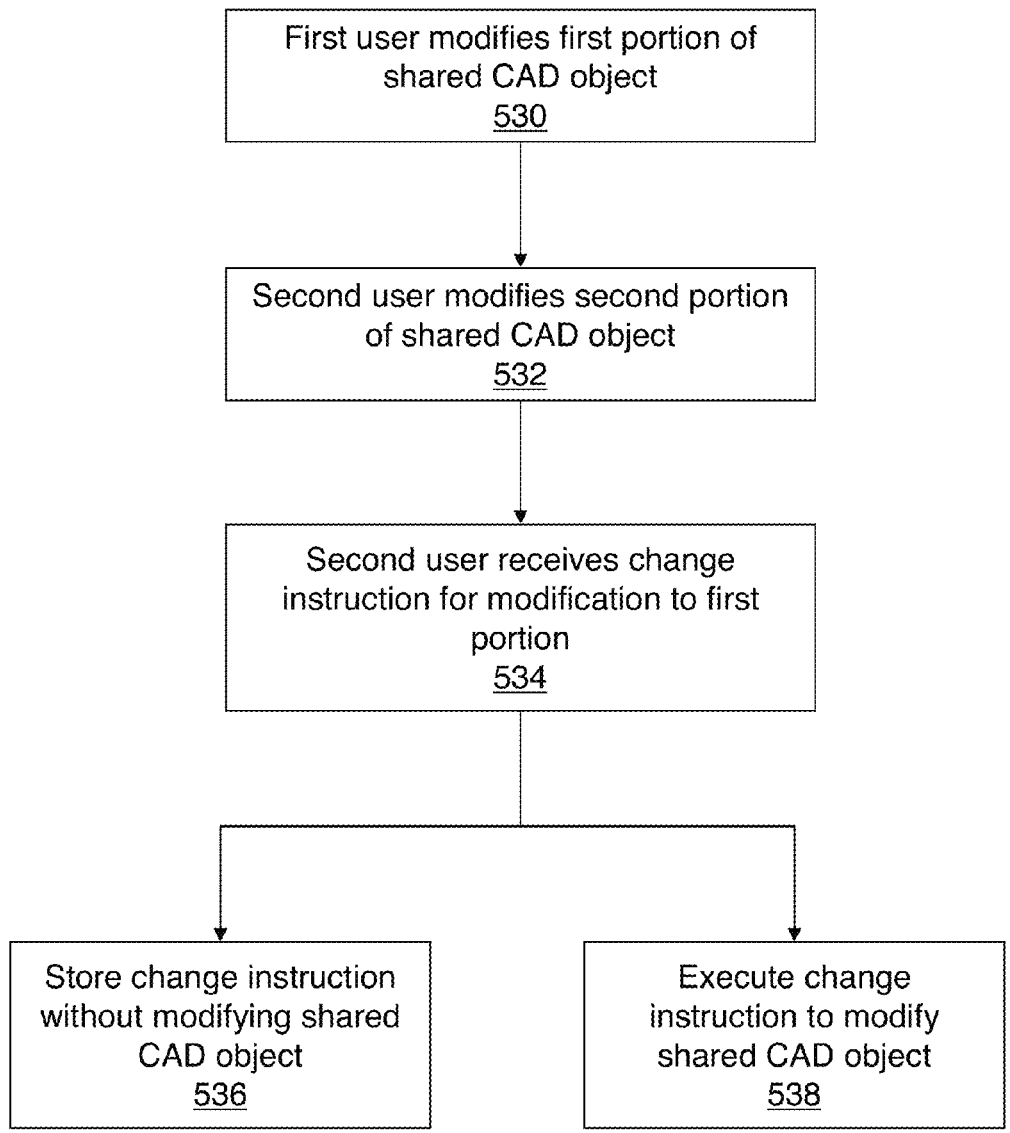
FIG. 5C is a flow chart of an embodiment of a method of managing concurrent design of computer-aided design objects or models by a plurality of users on a corresponding plurality of computing devices.

Referring now to FIG. 5C, shown is a flow chart of an embodiment of a method of managing concurrent design of computer-aided design objects or models by a plurality of users on a corresponding plurality of computing devices. In brief overview, at step 530, a first user of a first CAD application executed by a processor of a first computing device may modify a first portion of a shared CAD object. At step 532, a second user of a second CAD application, either executed by the same computing device in embodiments where the computing device is an application server, or executed by a processor of a second computing device, may modify a second portion of the shared CAD object. At step 534, the second user may receive a change instruction or notification of a change instruction representative of the first user's modification to the first portion of the shared CAD object. In one embodiment, at step 536, the second user may store the change instruction or notification without executing the change instruction or modifying a local copy or a portion of the shared CAD object that the second user is working on. In another embodiment, at step 538, the second user may execute the change instruction to modify the local copy or the portion of the shared CAD object that the second user is working on.

Still referring to FIG. 5C and in more detail, at step 530, a first user may modify a first portion of a shared CAD object. In some embodiments, a first portion may refer to a first section or first entity or plurality of entities of the CAD object, such as geometry data of the passenger compartment discussed above. In other embodiment, the first portion may refer to a chapter or information item of the CAD object, such as geometry data or assembly data. In some embodiments, the shared CAD object may comprise a plurality of interrelated models, as discussed above. In another embodiment, modifying the first portion of the shared CAD object may comprise modifying a first set of one or more models of the shared CAD object. In another embodiment, the shared CAD object may comprise a plurality of chapters or information items. In a further embodiment, modifying a first portion of the shared CAD object may comprise modifying a first chapter or information item of the plurality of chapters or information items.

At step 532, a second user may modify a second portion of the shared CAD object. Similar to step 530, in some embodiments, the second portion may refer to a different section of the same information item of the CAD object as the first user had modified, while in other embodiments, the second portion may refer to a second chapter or information item of the CAD object. In another embodiment, modifying the second portion of the shared CAD object may comprise modifying a second set of one or more models of the shared CAD object. In another embodiment, modifying a second portion of the shared CAD object may comprise modifying a second chapter or information item of a plurality of chapters or information items of the shared CAD object.

At step 534, the second user may receive a change instruction or a notification of a change instruction representative of the first user's modification. As discussed above, in embodiments using a notification service, the second user may receive a notification of a change instruction and may request the change instruction to be transmitted to the second CAD application used by the second user. In some embodiments in which an intermediary or server provides notifications and stores change instructions, the first computing device and second computing device need not be simultaneously online to communicate the change instruction from the first computing device to the second computing device. Rather, the first computing device may send a change instruction to the server and the server may notify and provide the change instruction, upon request, to the second computing device.

In one embodiment, at step 536, the second user may store the change instruction without modifying the shared CAD object, a second information item or chapter of the shared CAD object, or a local copy of the shared CAD object, displayed to the second user. This may be done, in some embodiments, responsive to a determination by the second CAD application that the modification to the first portion of the CAD object does not affect the second portion of the CAD object. For example, in one such embodiment, the second portion of the CAD object may have no dependencies on the first portion of the CAD object. In another embodiment, the second user may store the change instruction for execution at a later time. This may be done, for example, if the second user is making design modifications or attempting "what-if" branches as discussed above with regard to FIG. 5B.

In another embodiment, at step 538, the second user may execute the change instruction to modify the shared CAD object, a second chapter or information item of the shared CAD object, or a local copy of the shared CAD object displayed to the second user. In a further embodiment, the second user may combine the modifications to the first portion of the shared CAD object represented in the change instruction with the modifications to the second portion of the shared CAD object. In another further embodiment, the second user may override or reject a first one or more instructions in the change instruction, and execute the remaining non-overridden instructions in the change instruction. This may be done to allow a reviewing process of the first user's work by the second user.

Along with using change instructions internally in a single application to attempt different modifications and explore "what-if" designs, change instructions may also be used by a single user across a plurality of applications or by a plurality of users working concurrently to attempt and explore different modifications of a design. For example, a user may work on a model in a CAD modeling program, switch to an engineering analysis program and make measurements, and then based on the results of those measurements, make modifications in an CAD assembly program. Typically, users of these systems would have to save the model at each step, and export or import the model into a different format for each new application. If the user never changes his or mind or needs to return to an earlier state, this can work, despite its inefficiencies. Accordingly, one aspect of the present invention includes a method and system for managing concurrent use of a common data model object in a plurality of running applications. As the user makes modifications and edits to an information item, change instructions are passed to inactive applications on the same computing device, similar to the methods of passing change instructions to other computing devices. In one embodiment, inactive applications automatically execute the change instructions in the background. In another embodiment, inactive applications execute one or more change instructions generated by one or more previously active applications upon becoming active. For example, a user may make modifications in a first application, and change instructions may be placed in a buffer or storage. The user may switch to a second application, such that the second application is the active application. The second, active application may then execute change instructions placed in the buffer since the last it was active. The user may use the second, active application to make more modifications to the model, generating additional change instructions. The user may then switch to a third application, such that the third application is the active application. The third application may then execute both the change instructions from the first application and the change instructions from the second application, as well as any other change instructions generated for the model since the last time the third application was the active application. This may be done upon activation of the application, such that the user is unaware that the application was using an inconsistent or obsolete model at any point.

Figure 6A:
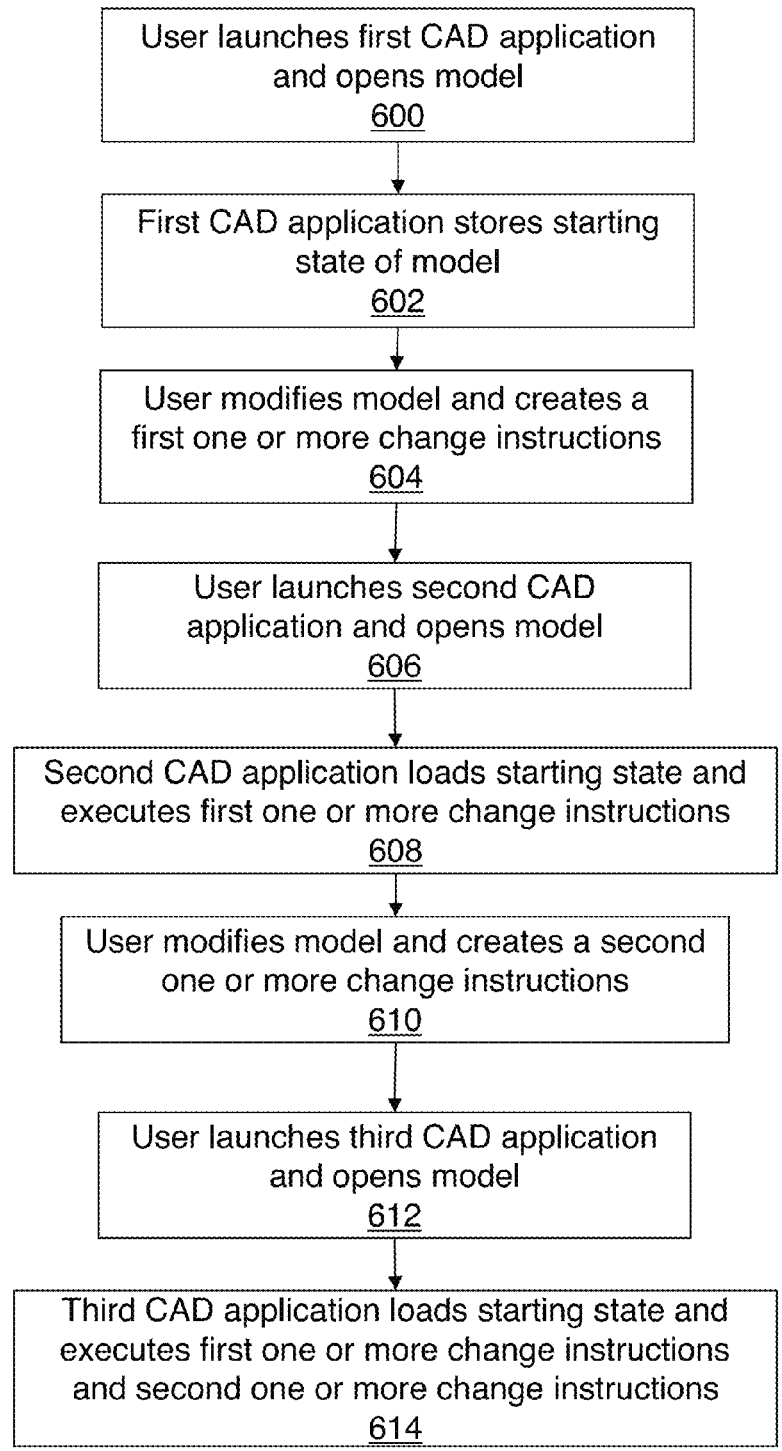
FIG. 6A is a flow chart of an embodiment of a method of managing consistency of a model used by a plurality of applications using a common data model.

Referring now to FIG. 6A, illustrated is a flow chart of an embodiment of a method of managing consistency of a model used by a plurality of applications using a common data model. In brief overview, at step 600 a user may launch a first CAD application and open a model. At step 602, the first CAD application may store a starting state of a model, as discussed above in connection with FIG. 5B. At step 604, the user may modify the model, causing the first CAD application to create a first one or more change instructions. At step 606, the user may launch a second CAD application and open the model. At step 608, the second CAD application may load the stored starting state of the model and the first one or more change instructions, and execute the first one or more change instructions. At step 610, the user may modify the model, causing the second CAD application to create a second one or more change instructions. At step 612, the user may launch a third CAD application and open the model. At step 614, the third CAD application may load the stored starting state of the model, the first one or more change instructions, and the second one or more change instructions, and execute the first one or more change instructions and the second one or more change instructions.

Still referring to FIG. 6A and in more detail, at step 600, the user may launch a first CAD application and open a model. In some embodiments, launching the first CAD application may comprise launching the CAD application from a desktop, start menu, or other user interface, while in other embodiments, launching the first CAD application may comprise opening a CAD model that has a file type association (FTA) to the first CAD application. In still other embodiments, launching the first CAD application may comprise launching an application launcher, discussed in more detail below in connection with FIGS. 8A-8C. In one such embodiment, the CAD model may include a file type association that causes an operating system to launch the application launcher.

At step 602, in some embodiments, the first CAD application may store a starting state of the model. In one embodiment in which an application launcher has been launched prior to launching the first CAD application, the application launcher may store a starting state of the model. In one embodiment, the stored starting state of the model may include a timestamp or other identifier, or an indication of a line of equivalence or consistent state of the model.

At step 604, in some embodiments, the user may modify the model. In one embodiment, the user may modify one or more chapters or information items of the model. In some embodiments, modifying the model, chapter, or information item may cause the first CAD application to create a first one or more change instructions representative of the modification or operation. In one embodiment, the first CAD application may store the one or more change instructions in a temporary folder associated with the model, in a central storage repository, as part of the model, as part of the stored starting state of the model, or in any other format or location such that a second CAD application opening the model may be able to locate both the model, the stored starting state, and the one or more change instructions.

At step 606, in some embodiments, the user may launch a second CAD application and open the model. In many embodiments, the user may launch the second CAD application without quitting or ceasing execution of the first CAD application.

At step 608, in some embodiments, the second CAD application may load the stored starting state of the model and the first one or more change instructions. The second CAD application may, in some embodiments, execute the one or more change instructions on the stored starting state of the model to achieve a state consistent with the modifications to the model by the user in the first CAD application. In other embodiments, such as where the second CAD application reads a chapter of the model unaffected by the first one or more change instructions, the second CAD application may not execute the first one or more change instructions. For example, in one such embodiment, the user may open a model in an engineering analysis application and perform various operations, creating change instructions to an analysis chapter of the model. The user may then open the model in a direct modeling CAD application. Since, in many embodiments, the direct modeling CAD application may not be able to read the analysis chapter of the model, the direct modeling CAD application may not execute the one or more change instructions.

At step 610, in some embodiments, the user may modify the model with the second CAD application. In one embodiment, the user may modify one or more chapters or information items of the model. In some embodiments, modifying the model, chapter, or information item may cause the second CAD application to create a second one or more change instructions representative of the modification or operation. As with the first one or more change instructions, the second one or more change instructions may be stored with the model, in a temporary location, or in other various locations or formats such that other applications may easily locate the change instructions.

At step 612, in some embodiments, the user may launch a third CAD application and open the model. In many embodiments, the user may launch the third CAD application without quitting or ceasing execution of the first or second CAD application. In other embodiments, the user may quit or cease execution of either other application.

At step 614, in some embodiments, the third CAD application may load the stored starting state of the model, the first one or more change instructions, and the second one or more change instructions. The third CAD application may, in some embodiments, execute either or both of the first one or more change instructions and the second one or more change instructions on the stored starting state of the model to achieve a state consistent with the modifications to the model by the user in the first and/or second CAD application. As discussed above, in other embodiments, such as where the third CAD application reads a chapter of the model unaffected by the first and/or second one or more change instructions, the third CAD application may not execute the respective first and/or second one or more change instructions.

Figure 6B:
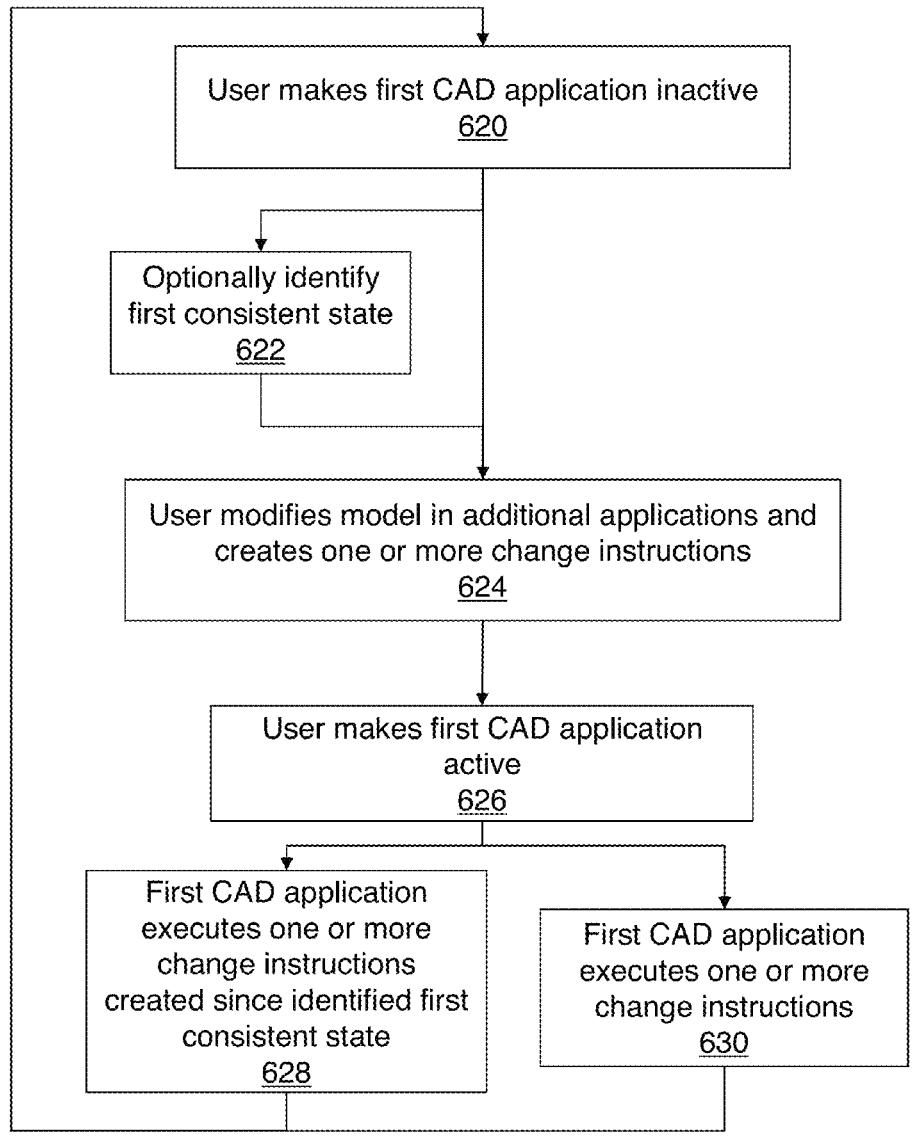
FIG. 6B is another flow chart of an embodiment of a method of managing consistency of a model across a plurality of active applications using a common data model.

Shown in FIG. 6B is another flow chart of an embodiment of a method of managing consistency of a model across a plurality of active applications using a common data model. In brief overview, at step 620, a user simultaneously or concurrently using a plurality of CAD applications with a common data model may make a first CAD application inactive, or conversely make another CAD application active. Responsive to becoming inactive, in one embodiment at step 622, the CAD application may identify a current consistent state. In some embodiments, step 622 may be skipped. In one embodiment, at step 624, the user may modify the model in one or more additional applications, causing the one or more additional applications to create one or more change instructions. At step 626, the user may make the first CAD application active. If step 622 was not skipped, at step 628, responsive to becoming active, the first CAD application may execute one or more change instructions created since the identified first consistent state. If step 622 was skipped, then at step 630, responsive to becoming active, the first CAD application may execute one or more change instructions associated with the CAD object.

Still referring to FIG. 6B and in more detail, at step 620, a user of a first CAD application, executed by a processor of a computing device, and viewing or editing a CAD model in a common data model may make the first CAD application inactive. In some embodiments, the user may launch a second CAD application to make the first CAD application inactive, while in other embodiments, the user may switch to an executing but inactive CAD application. In many embodiments, the second CAD application or other CAD application (referred to generally as the second CAD application) may also be viewing or editing the same CAD model in the common data model. In one embodiment, the second CAD application may read, modify, or operate on the same chapter of the CAD model, while in other embodiments, the second CAD application may read, modify, or operate on a different chapter of the CAD model.

At step 622, in some embodiments, responsive to becoming inactive, the first CAD application may identify a first consistent state of the CAD model. This may be done to reduce the number of change instructions to be executed later. For example, as discussed above in the method of FIG. 6A, a starting state of the model may be stored when an editing session is begun, and change instructions may be created for each modification in one or more CAD applications. Many instructions may be created during the course of the session. Accordingly, to reduce the need to re-execute every change instruction when simply switching between an inactive and active application, in some embodiments, when becoming inactive, an application may remember a consistent state of the model or a point in the list of change instructions that the model in memory of the application has been updated to. For example, if a CAD application has loaded a model and applied three change instructions, when becoming inactive, the CAD application may store an identification that the application has executed those three change instructions. When becoming active again, the CAD application then only needs to apply any further change instructions. In some embodiments, however, step 622 may be skipped and when becoming active, the application may reload the starting state of the model and execute one or more change instructions. While this may require more processing, programming of the application may be simpler. Additionally, this embodiment may allow for alternate design branches and undo stacks across a plurality of applications, as discussed in more detail below.

At step 624, in some embodiments, the user may modify the model in one or more additional CAD applications. This may cause the one or more additional CAD applications to generate one or more change instructions, as discussed above.

At step 626, the user may make the first CAD application active. This may be done in some embodiments by selecting the CAD application from a switcher or launcher, as discussed in more detail below, by selecting the CAD application from a taskbar or user interface provided by an operating system, or by quitting the one or more additional CAD applications without quitting the first CAD application.

At step 628, in one embodiment if the CAD application had identified at step 622 a first consistent state or number of change instructions already applied, the CAD application may load and execute one or more change instructions created subsequent to the first consistent state or additional instructions created since the application became inactive.

In another embodiment, at step 630, responsive to becoming active, the first CAD application may load a starting state of the model and the one or more change instructions and execute said one or more change instructions. This may be similar to the method illustrated in FIG. 6A.

The use of change instructions to manage consistency of models in concurrent use of a plurality of applications may provide further benefits. If after making modifications in a second application, such as a CAD assembly program, the user decides that the first modification in the CAD modeling program was inappropriate, typically, the user may have to reload the first model, losing the benefits of the engineering analysis. However, in one embodiment of the present system, change instructions may be used to return to prior states of the object or model, and thus may be used to manage undo stacks across a plurality of applications using a common data model. In one embodiment, undoing an operating in an active common data model application may cause undoing all of the related operations performed subsequently in inactive common data model applications automatically.

Figure 6C:
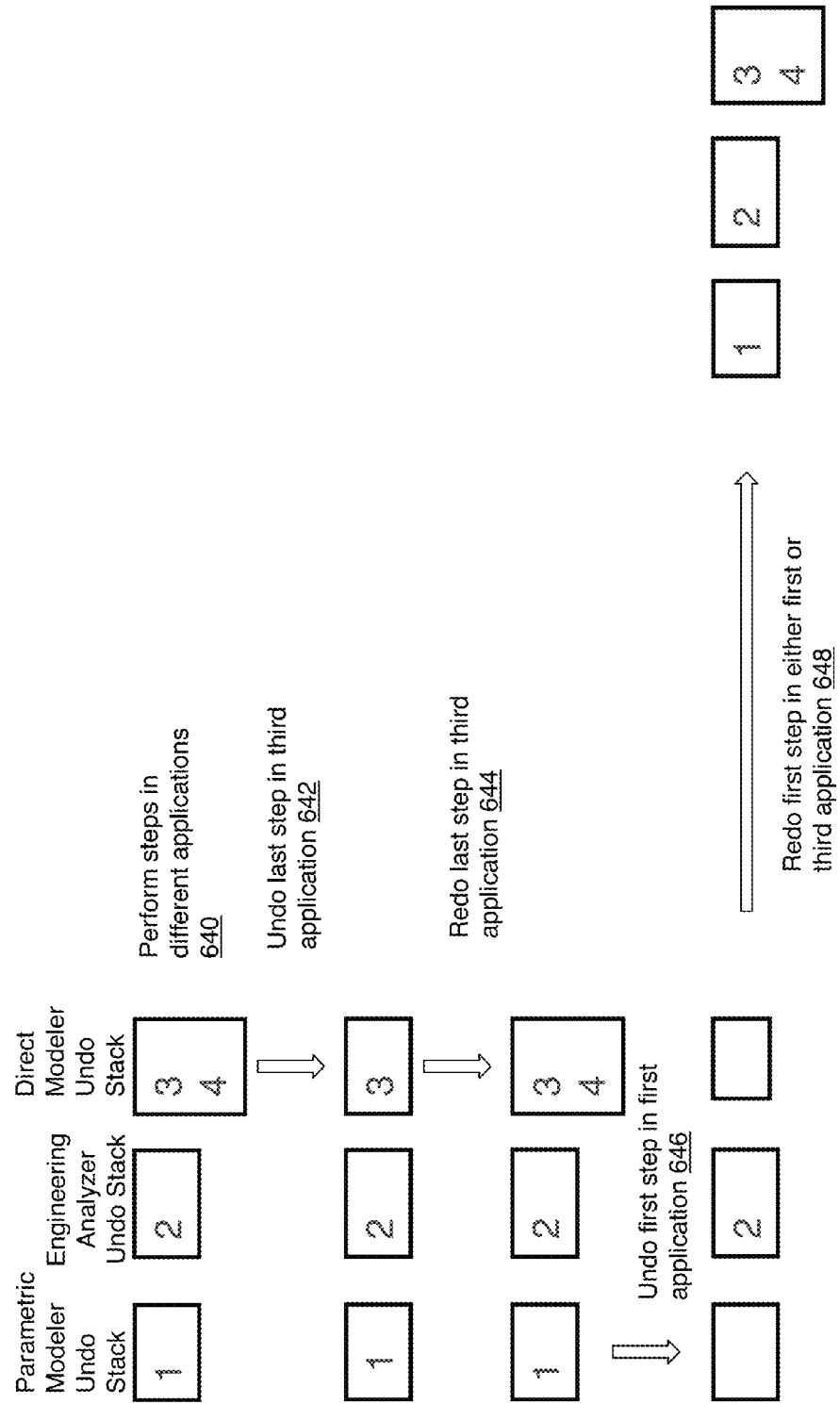
FIG. 6C is an activity chart of an embodiment of a method of managing undo stacks across a plurality of applications using a common data model.

For example, shown in FIG. 6C is an activity chart of an embodiment of a method of managing undo stacks across a plurality of applications using a common data model. At step 640, A user may open a model in a parametric modeling CAD application and make a first operation (1) on a model, such as an extrude of a face. As discussed above in reference to FIG. 5B, this may cause the CAD application to store a first state of the model and generate a change instruction. Said change instructions may be passed to other CAD applications. Thus, in one embodiment, when the user switches to an engineering analysis program, the change instruction may be executed and various parts of the model regenerated to create a consistent state of an engineering analysis chapter or information item of the CAD model. The user may then perform analysis (2) on the model, which may be unrelated to the geometry. Responsive to the analysis, the user may use a direct modeling CAD application to make further operations (3) and (4), such as moving a face of the extrude, and moving a second fact of the extrude. Each operation may trigger a change instruction being sent to one or both of the other CAD applications, or other CAD applications not shown.

At step 642, the user may undo the last step in the direct modeling CAD application, and at step 644 the user may redo the last step. In many embodiments, this may be similar to normal uses of undo stacks within an application. However, as discussed above, undoing and redoing the steps may trigger change instructions to be sent to the other applications, such that if the user switches to either application, they will see the model without or with the $4^{th}$ operation, respectively.

At step 644, the user may switch to the first, parametric modeling CAD application and undo the first operation (1). In one embodiment, undoing the first operation may trigger a change instruction being sent to the other applications. Because operations (3) and (4) were modifications to geometry dependent on the extrude of operation (1), they may be also undone by undoing the first operation. As discussed above, in many embodiments, undoing an operation in an active common data model application will undo any related operations done subsequently in inactive common data model applications. Operations are related if they operate on the same chapter or information item. Accordingly, undoing operation (1), which modified the geometry chapter may cause undoing operations (3) and (4), which also modify the geometry chapter, but not operation (2), which modified the analysis chapter. In many embodiments, undoing the first operation may trigger a change instruction being communicated to other CAD applications.

At step 646, in some embodiments, the user may redo the first operation (1) in either the first or third applications. As discussed above in connection with FIG. 5B, an application may include a chain or branching tree of change instructions from a first stored state of a model. Accordingly, even if the user has stepped back to an intermediate state on the chain or tree, the user can easily return to any other state, including prior or subsequent states on the chain, or on different branches of the tree, and the common data model application may automatically execute and recalculate change instructions as necessary. Accordingly, in either application, the user may redo the first operation (1) and cause automatic execution of operations (3) and (4) and regeneration of features and entities of the geometry chapter.

Figure 7A:
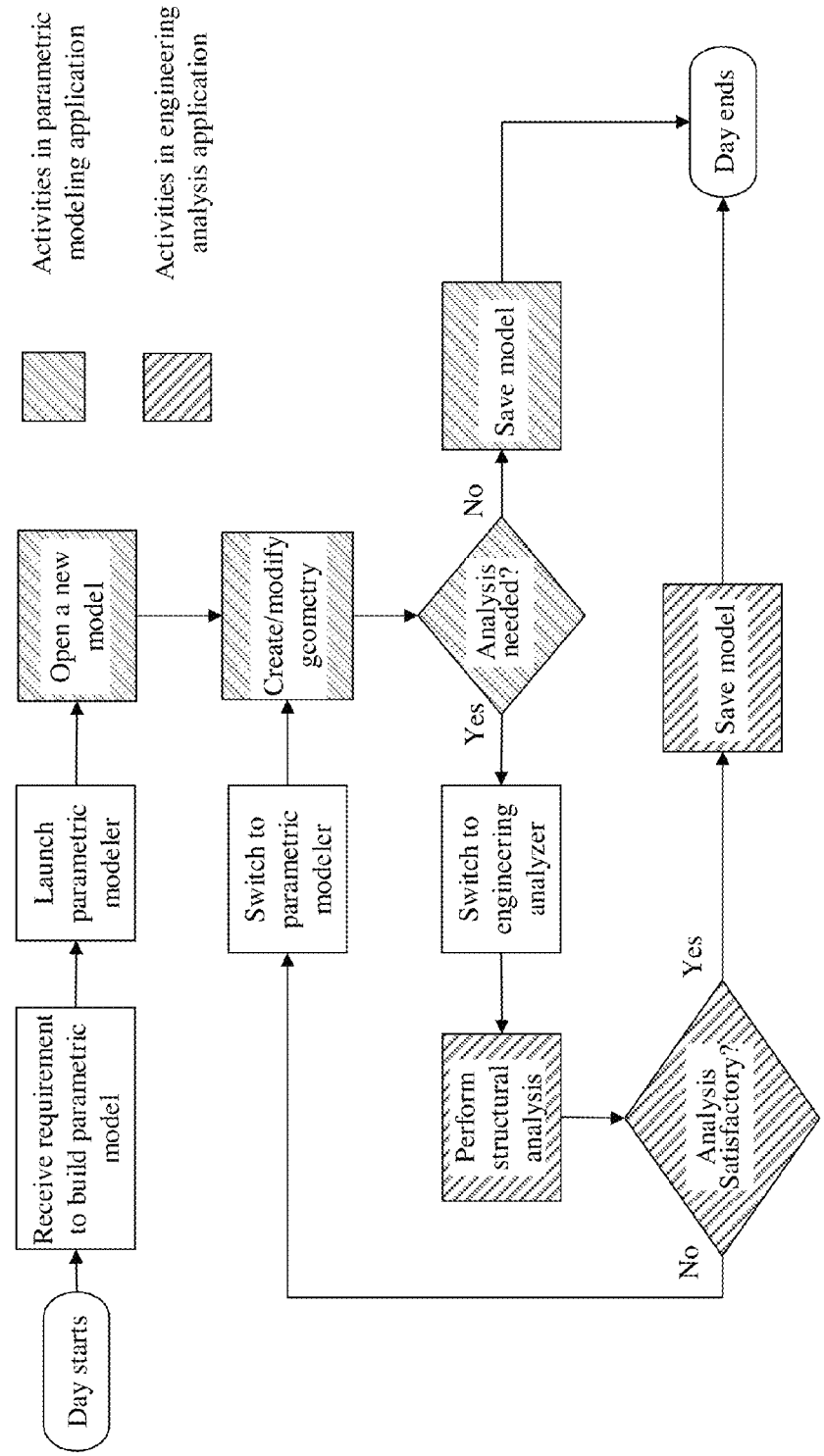
FIG. 7A is a flow chart of a first example embodiment of using a common data model with a plurality of applications.

Accordingly, in many embodiments, a user may use multiple applications of a suite on a single object with a common data model as if all of the applications are different aspects of a single application. The user experience is greatly enhanced because of the interoperability of the related parts of the suite. FIG. 7A is a flow chart of a first example embodiment of using a common data model with a plurality of applications. In brief overview, a user's day may start by receiving a requirement to build a parametric model. The user may launch a parametric modeling CAD application. In the parametric modeling application, the user may open a new model and create and modify geometry. If no analysis is needed, the user may save the model, completing his or her task.

Alternately, if analysis is required, then the user may switch to an engineering analysis program. The program may utilize the same common data model, eliminating the need to save, export, and open the model in a different format. Instead, the engineering analysis program may operate on the same model, reading the geometry chapter and modifying the analysis chapter, for example. In the engineering analysis application, the user may perform a structural analysis on the model. If the analysis is satisfactory, the user may save the model, completing his or her task.

Alternately, if the analysis is not satisfactory, the user may switch back to the parametric modeler and modify or create further geometry of the model. The user may then iteratively perform further analysis and modification until the model or analysis is satisfactory.

Figure 7B:
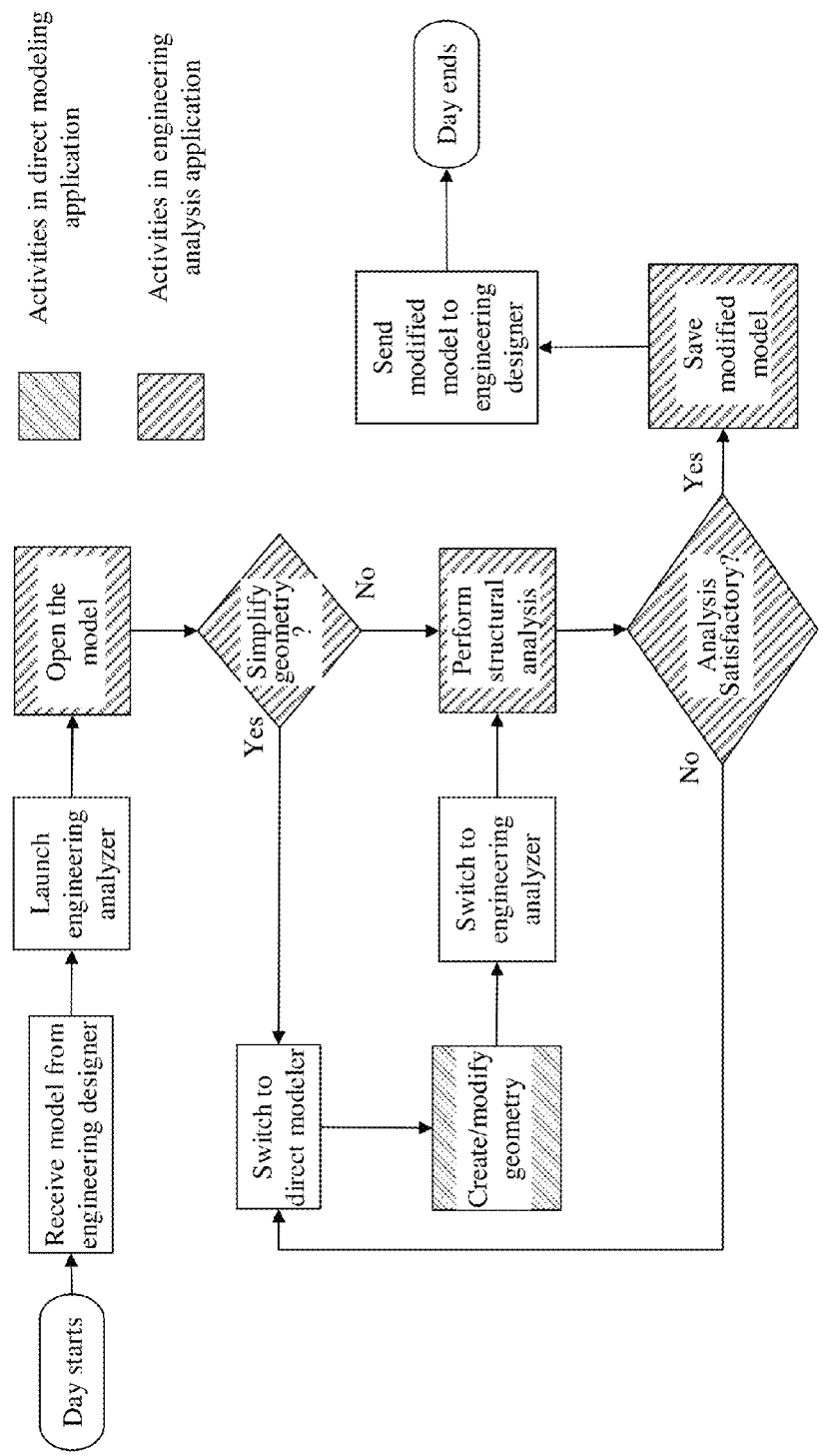
FIG. 7B is a flow chart of a second example embodiment of using a common data model with a plurality of applications.

Referring now to FIG. 7B, illustrated is a flow chart of a second example embodiment of using a common data model with a plurality of applications. In this example, the user's day may start with the user receiving a model from an engineering designer. The user may launch an engineering analysis application and open the model. In some embodiments, the user may perform structural analysis on the model directly and, if the analysis is satisfactory, save the model and return the model to the engineering designer.

Alternately, in many embodiments, particularly with very complicated models, the user may wish to simplify the model prior to performing structural analysis. For example, if the user is primarily concerned with fit and placement with surrounding parts, the user may wish to remove or disable internal objects or components of the model, because they have no effect on the overall size. Accordingly, in such an embodiment, the user may switch to a direct modeling CAD application and modify the geometry of the model. The user may then switch back to the engineering analysis application, in which the model may be automatically updated via a change instruction sent from the direction modeling CAD application. The user may then perform further structural analysis on the model.

Furthermore, if the structural analysis is unsatisfactory, the user may switch back to the direct modeling CAD application, modify the geometry, and perform further analysis and modification until a satisfactory result is achieved.

Figure 8A:
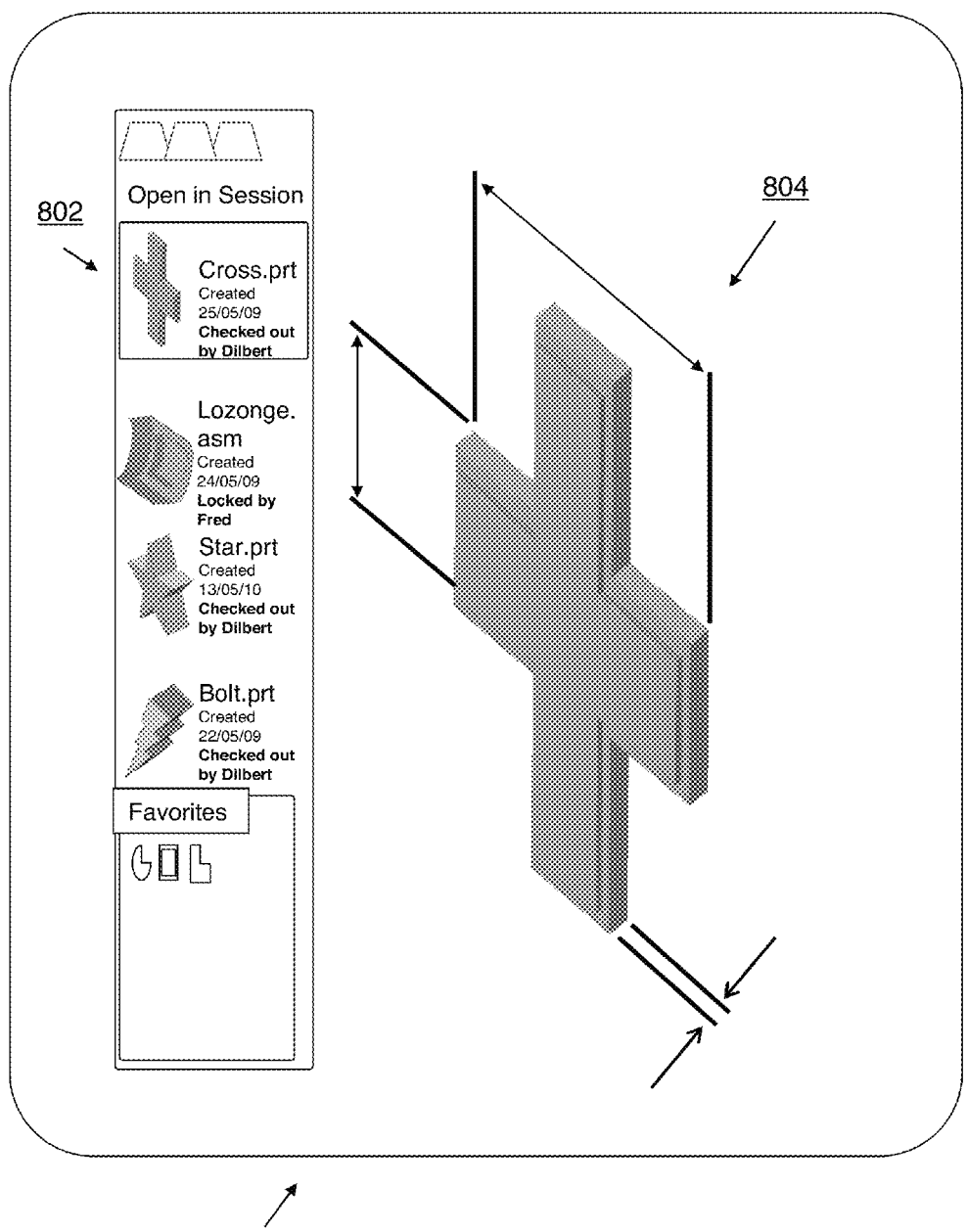
FIGS. 8A-8C are screenshots of embodiments of a system for using a common data model with a plurality of applications.
Figure 8B:
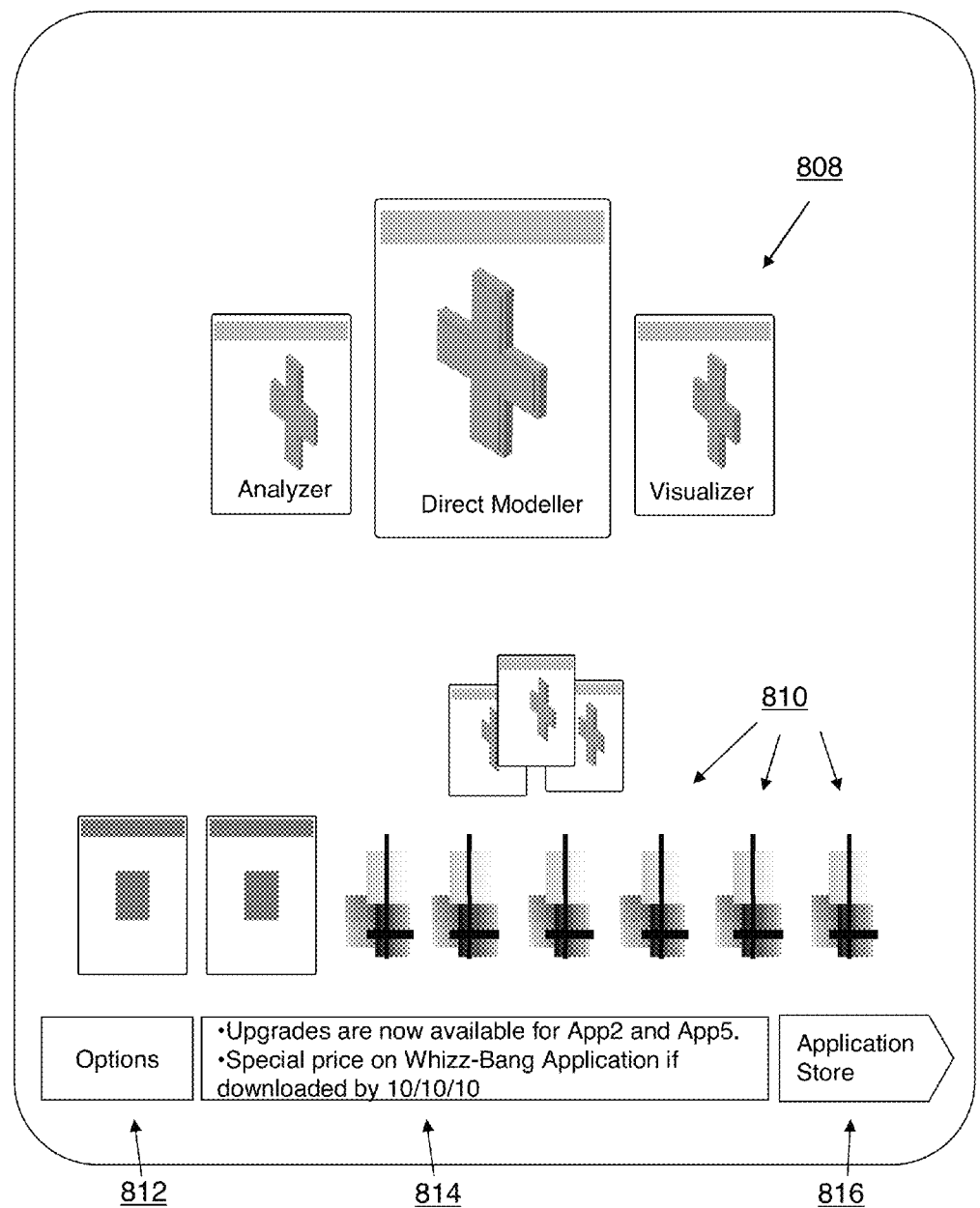
Figure 8C:
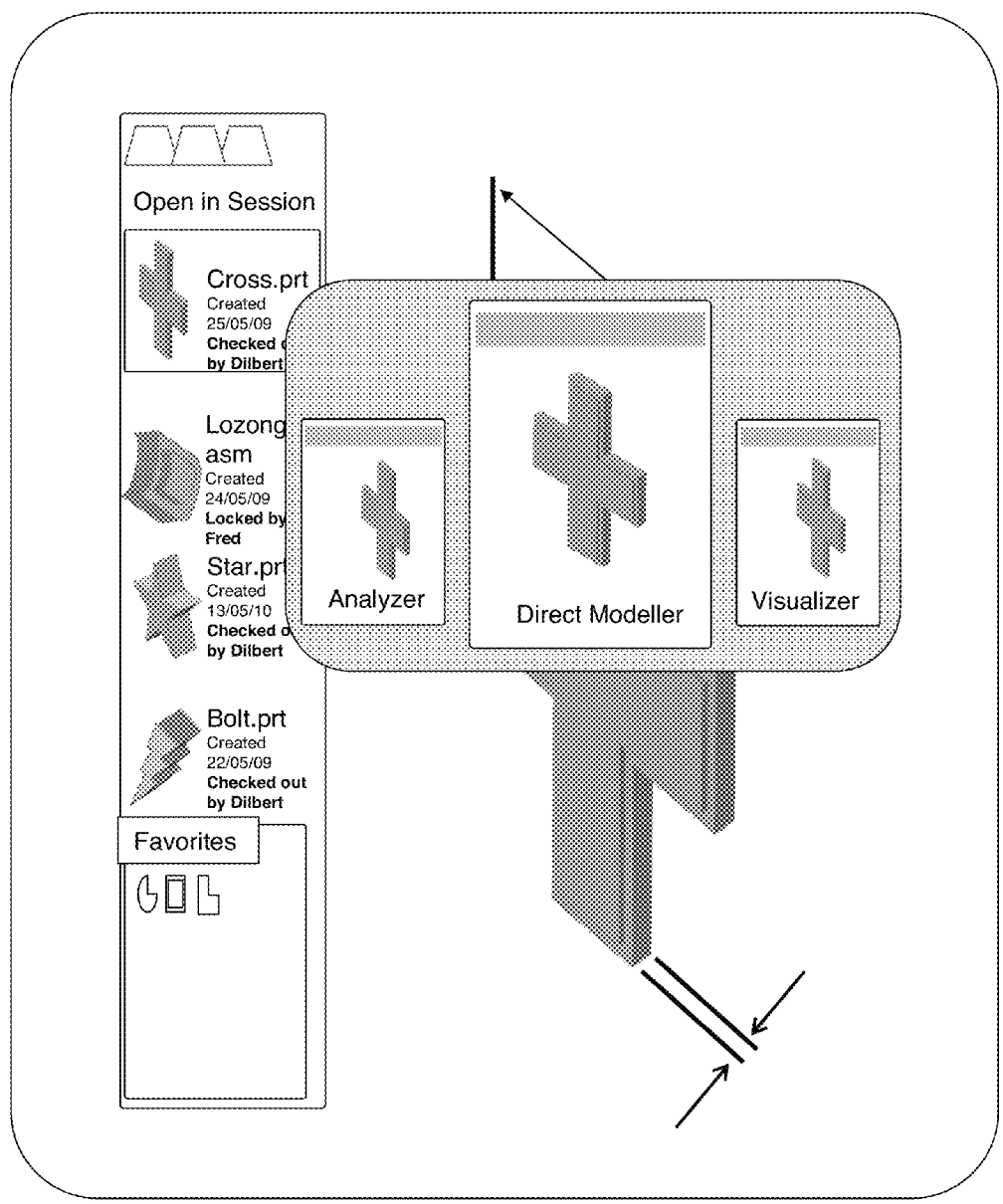

FIGS. 8A-8C are screenshots of embodiments of a switcher provided by a system for using a common data model with a plurality of applications. In brief overview, as shown in FIG. 8A, in some embodiments, a switcher 800 may comprise a separate application, dashboard, or launcher for launching a model into one or more of a plurality of CAD applications of a suite. In some embodiments, the switcher may show a list or index 802 of one or more models, which may include thumbnail images. In one embodiment, selecting a model from the list or index 802 may cause the switcher 800 to display a large image of the model in a central portion 804 of the switcher window.

Referring now to FIG. 8B, in some embodiments, a switcher may comprise a dashboard 806 for switching between a plurality of running applications 808, such as the Analyzer application, Direct Modeler application, and the Visualizer application as shown. In some embodiments, the plurality of running applications 808 may be shown with an active or foremost application enlarged, such as the Direct Modeler application. In one embodiment, the dashboard 806 may be launched via a menu or key command, similar to the alt-tab application switcher displayed in the Windows Operating System, manufactured by Microsoft Corp. In some embodiments, the dashboard 806 of FIG. 8B may appear as an overlay on top of a currently executing application. In a further embodiment, the dashboard 806 of FIG. 8B may comprise a translucent or semi-transparent background such that the currently active application is visible through the dashboard 806. In some embodiments, as shown, the dashboard 806 may include one or more buttons for launching additional applications 810. In other embodiments, the dashboard 806 may comprise one or more buttons, including an options button 812. The dashboard 806 may further comprise a message box 814, which may display messages or advertisements downloaded via a network, such as the Internet, from a CAD application manufacturer. Although referred to as a message box, in many embodiments, message box 814 may comprise a button or link, such that clicking on a message in the box opens a web browser, application store, or other component or application. In one embodiment, dashboard 806 may include a button for initiating a connection to an application store 816 via a web browser, applet, application, or other interface for viewing and purchasing upgrades or new applications of a CAD development suite.

Referring briefly to FIG. 8C, in some embodiments the launcher of FIG. 8A and active application switcher of FIG. 8B may be combined. For example, a user may use the launcher to open new models in one or more applications, and may use the application switcher to switch between active applications.

CONCLUSION

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

Having described certain embodiments of methods and systems for providing seamless thumbnails for hosted applications, it will now become apparent to one of skill in the art that other embodiments incorporating the concepts of the invention may be used.

What is claimed is:

1. A method of managing concurrent design of computer-aided design (CAD) models, comprising:
    providing, to a processor of a computing device, a plurality of different CAD applications including (a) a modeling application configured to edit geometric features of the CAD models, (b) an engineering analysis application configured to perform engineering analyses on the CAD models, and (c) an assembly application configured to modify how different CAD models, each corresponding to a respective distinct physical object, are assembled together, each of the plurality of different CAD applications having an active state and an inactive state;
    executing, using the processor, a first CAD application selected from the plurality of different CAD applications such that the first CAD application is in an active state while, concurrently, a second CAD application of the plurality of CAD applications is in an inactive state, wherein the first application is the modeling application or the assembly application;
    storing, by the first CAD application executed by a processor of the computing device, a starting state of a CAD model;
    modifying the CAD model via the first CAD application executed by the processor in response to commands from a user;
    creating, by the first CAD application and responsive to the modification, a first one or more change instructions representative of the modification to the geometric features of the CAD model;
    sending the first one or more change instructions of the geometric features to the second CAD application, the one or more change instructions being sent when the second CAD application is in the inactive state, wherein the second application is the engineering analysis application; and
    responsive to a selection of the second CAD application by the user, automatically changing, by the processor, (a) the first CAD application from the active state to the inactive state and (b) the second CAD application from the inactive state to the active state, wherein
    responsive to the change of the second CAD application from the inactive state to the active state, automatically loading, by the processor, the stored starting state of the CAD model and automatically executing the one or more change instructions of the geometric features, by the processor executing the second CAD application, wherein the execution of the one or more change instructions produces a modification to the engineering analyses of the CAD model for the engineering analysis application.

2. The method of claim 1, wherein storing the starting state of the CAD model comprises storing the starting state of the CAD model, responsive to loading the CAD model by the first CAD application.

3. The method of claim 1, wherein modifying the CAD model comprises modifying a first one or more objects of the CAD model; and regenerating, by the first CAD application, a second one or more objects of the CAD model dependent on the first one or more objects.

4. The method of claim 3, wherein creating the first one or more change instructions comprises creating a first one or more change instructions representative of the modification to the first one or more objects, such that execution of the one or more change instructions causes a CAD application to regenerate the second one or more objects dependent on the first one or more objects.

5. The method of claim 1, further comprising:
modifying, via the second CAD application, the CAD model;
creating, by the second CAD application and responsive to the modification, a second one or more change instructions representative of the modification to the CAD model;
loading, by the first CAD application, the second one or more change instructions; and
executing, by the first CAD application, the second one or more change instructions to reproduce the modification to the CAD model.

6. The method of claim 5, wherein the second one or more change instructions represent the modifications to the CAD model in the second CAD application subsequent to execution of the first one or more change instructions.

7. The method of claim 5, further comprising:
requesting to undo the first one or more change instructions, via the first CAD application; and
loading, by the first CAD application, the starting state of the CAD model.

8. The method of claim 7, further comprising executing, by the first CAD application, the second one or more change instructions, wherein the second one or more change instructions modify a chapter of the CAD model unrelated to the chapter modified by the first one or more change instructions.

9. The method of claim 1, wherein the processor is a single processor.

10. A system for managing concurrent computer-aided design (CAD) models, comprising a computing device comprising a processor configured to execute:
a plurality of different CAD applications including (a) a modeling application configured to edit geometric features of the CAD models, (b) an engineering analysis application configured to perform engineering analyses on the CAD models, and (c) an assembly application configured to modify how different CAD models, each corresponding to a respective distinct physical object, are assembled together, each of the plurality of different CAD applications having an active state and an inactive state;
a first CAD application selected from the plurality of different CAD applications and configured, in the active state, to (a) store a starting state of a CAD model; (b) modify geometric features of the CAD model in response to commands from a user; (c) create, responsive to the modification, a first one or more change instructions representative of the modification to the geometric features of the CAD model; and (d) send the first one or more change instructions to a second CAD application selected from the plurality of different CAD applications, the one or more change instructions being sent when the second CAD application is in the inactive state;
a second CAD application configured to, responsive to a change of the second CAD application from the inactive state to the active state, (a) automatically load the stored starting state of the CAD model, and (b) automatically execute the first one or more change instructions representative of the modification to the geometric features of the CAD model to produce a modification to the engineering analyses of the CAD model for the second CAD application, wherein the first CAD application is a first type of the plurality of different CAD applications and the second CAD application is the second type of the plurality of different CAD applications different from the first type; and
a switching application wherein the processor, responsive to a selection of the second CAD application by the user, automatically changes (a) the first CAD application from the active state to the inactive state and (b) the second CAD application from the inactive state to the active state.

11. The system of claim 10, wherein the first CAD application is configured to store the starting state of the CAD model, responsive to loading the CAD model by the first CAD application.

12. The system of claim 10, wherein the first CAD application is configured to modify, responsive to a request, a first one or more objects of the CAD model; and regenerate a second one or more objects of the CAD model dependent on the first one or more objects.

13. The system of claim 12, wherein the first CAD application is configured to create a first one or more change instructions representative of the modification to the first one or more objects, such that execution of the one or more change instructions causes a CAD application to regenerate the second one or more objects dependent on the first one or more objects.

14. The system of claim 10, wherein the second CAD application is configured to modify the CAD model responsive to a request, and create, responsive to the modification, a second one or more change instructions representative of the modification to the CAD model; and
the first CAD application is configured to load the second one or more change instructions; and execute the second one or more change instructions to reproduce the modification to the CAD model.

15. The system of claim 14, wherein the second one or more change instructions represent the modifications to the CAD model in the second CAD application subsequent to execution of the first one or more change instructions.

16. The system of claim 14, wherein, responsive to a request to undo the first one or more change instructions, the first CAD application is configured to load the starting state of the CAD model.

17. The system of claim 16, wherein the first CAD application is configured to execute the second one or more change instructions, wherein the second one or more change instructions modify a chapter of the CAD model unrelated to the chapter modified by the first one or more change instructions.

18. A non-transitory computer-readable storage medium encoded with instructions configured to be executed by a processor, the instructions which, when executed by the processor, cause the processor to implement a method for managing concurrent design of computer-aided design (CAD) models, the method comprising:
executing a first CAD application selected from a plurality of different CAD applications including (a) a modeling application configured to edit geometric features of the CAD models, (b) an engineering analysis application configured to perform engineering analyses on the CAD models, and (c) an assembly application configured to modify how different CAD models, each corresponding to a respective distinct physical object, are assembled together, each of the plurality of different CAD applications having an active state and an inactive state, such that the first CAD application is in an active state while, concurrently, a second CAD application of the plurality of CAD applications is in the inactive state;
storing a starting state of a CAD model;
modifying geometric features of the CAD model via the first CAD application executed by the processor in response to commands from a user;

creating, by the first CAD application and responsive to the modification, a first one or more change instructions representative of the modification to the geometric features of the CAD model;

sending the first one or more change instructions to the second CAD application, the one or more change instructions being sent when the second CAD application is in the inactive state; and responsive to a selection of the second CAD application by the user, automatically changing, by the processor, (a) the first CAD application from the active state to the inactive state and (b) the second CAD application from the inactive state to the active state, wherein the first CAD application is a first type of the plurality of different CAD applications and the second CAD application is the second type of the plurality of different CAD applications different from the first type, wherein, responsive to the change of the second CAD application from the inactive state to the active state, automatically loading, by the processor, the stored starting state of the CAD model and automatically executing, by the processor, the one or more change instructions via the second CAD application, the execution of the one or more change instructions representative of the modification to the geometric features of the CAD model producing a modification to the engineering analyses of the CAD model for the second CAD application.

\* \* \* \* \*